United States Patent
Atluri et al.

(10) Patent No.: US 8,121,977 B2
(45) Date of Patent: Feb. 21, 2012

(54) ENSURING DATA PERSISTENCE AND CONSISTENCY IN ENTERPRISE STORAGE BACKUP SYSTEMS

(75) Inventors: Rajeev Atluri, Corona, CA (US); Srin Kumar, Sunnyvale, CA (US); Satish Kumar, Andhra Pradesh (IN); Kishor Paygude, Maharashtra (IN); Suman Inala, Belmont, CA (US); Greg Zavertnik, San Jose, CA (US); Yeganjaiah Gottemukkula, Andhra Pradesh (IN)

(73) Assignee: Iwmage Systems, Inc., Santa Clara, CA (US)

( * ) Notice: Subject to any disclaimer, the term of this patent is extended or adjusted under 35 U.S.C. 154(b) by 114 days.

(21) Appl. No.: 12/613,539

(22) Filed: Nov. 6, 2009

(65) Prior Publication Data

US 2010/0280999 A1    Nov. 4, 2010

Related U.S. Application Data

(63) Continuation-in-part of application No. 11/513,556, filed on Aug. 30, 2006, now Pat. No. 7,634,507.

(51) Int. Cl.
G06F 17/00 (2006.01)

(52) U.S. Cl. .................................... 707/609; 711/161

(58) Field of Classification Search .............. 707/1, 100, 707/200, 609, 687, 705, 802; 709/217, 219, 709/224; 711/161, 162
See application file for complete search history.

(56) References Cited

FOREIGN PATENT DOCUMENTS

WO    WO 2007/075587 A2 *    7/2007

* cited by examiner

Primary Examiner — Fred I Ehichioya
(74) Attorney, Agent, or Firm — Raj Abhyanker, P.C.

(57) ABSTRACT

Ensuring data persistence and consistency in enterprise storage backup systems method and apparatus are disclosed. In one embodiment, a method includes creating a data log structure (e.g., a log file) on a storage device (e.g., a Serial ATA drive, a SCSI drive, a SAS drive, a storage are network, etc.) coupled to an application server to store a backup data generated by a filter module in a continuous backup environment and buffering the backup data generated by the filter module through a memory module that transfers the backup data to the data log structure on the storage device based on an occurrence of an event. The data log structure may be created by configuring a portion of the storage device as a dedicated resource available to the memory module to copy the backup data and the data log structure may be a file on the storage device coupled to the application server having the file system.

24 Claims, 14 Drawing Sheets

US 8,121,977 B2

ENSURING DATA PERSISTENCE AND CONSISTENCY IN ENTERPRISE STORAGE BACKUP SYSTEMS

CLAIM OF PRIORITY

This application is a continuation-in-part and claims priority from a U.S. Utility application Ser. No. 11/513,556 filed on Aug. 30, 2006 now U.S. Pat. No. 7,634,507.

FIELD OF TECHNOLOGY

This disclosure relates generally to the technical fields of software and/or hardware technology and, in one example embodiment, to ensure data persistence and consistency in enterprise storage backup systems.

BACKGROUND

An application server may host several applications (e.g., an enterprise software application such as Oracle®, FoundationIP®, etc.) that may be accessed through a network (e.g., internet, WAN, LAN, etc.) by multiple clients. A backup server maybe used to continuously backup the application server (e.g., by having substitute copies and/or backup copies) through the network in an asynchronous manner (e.g., by not awaiting a write confirmation from the backup server during a continuous backup). A memory buffer of the application server may be used to buffer a backup data (e.g., by providing temporary storage) during the asynchronous backup operation. Data (e.g., backup data) in the memory buffer may be wiped out when the application server shuts down due to a certain event (e.g., a shutdown event, a power failure, etc.) resulting in a loss of the backup data. As a result, the backup server may not have a complete backup of the application server. The backup data may be unusable (e.g., corrupt and/or incomplete) as a result of the backup data loss.

Moreover a capacity of the memory buffer of the application server may be limited. A data backlog may be created in the memory buffer due to an unstable transfer rate of the backup data from the memory buffer to the backup server (e.g., due to limited bandwidth, a slow backup server, etc.). This may lead to a memory overflow and/or a memory crash that may instigate the backup data loss. Efforts to page the memory may be thwarted owing to a recursion that may arise when a paged memory attempts a write to a page file (e.g., due to unnecessary copies of the paged write created by a filter driver used in the continuous backup system) on a file system (e.g., Windows file system) of the application server. This may in turn lead to a system crash.

A consistent backup data (e.g., restorable backup data) may be generated by creating a snapshot (e.g., an image) of the data present on a storage device of the application server. The system may need considerable resources (e.g., disk space) to store the snapshot of the storage device of the application server on the backup server. Moreover, it may take a considerable amount of time to generate and store the snapshot of the storage device. An administrator and/or user (e.g., application server manager) may in turn have to limit and/or curtail the frequency of application consistency operations. As a result, the backup data may be inconsistent, unusable and/or incomplete.

SUMMARY

Ensuring data persistence and consistency in enterprise storage backup systems method and apparatus are disclosed.

In one aspect, a method includes creating a data log structure (e.g., a log file) on a storage device (e.g., a Serial ATA drive, a SCSI drive, a SAS drive, a storage area network, etc.) coupled to an application server to store a backup data generated by a filter module (e.g., a filter driver) in a continuous backup environment and buffering the backup data generated by the filter module through a memory module (e.g., a memory buffer) that transfers the backup data to the data log structure on the storage device based on an occurrence of an event.

The backup data generated by the filter module may be differentiated from a data write of the application server using a detection algorithm of the filter module when the memory module transfers the backup data to the data log structure and the backup data may be allowed to permeate (e.g., pass and/or filter through) through the filter module to prevent a recursion loop that arises when the filter module makes a redundant copy of the backup data during a transition of the backup data from the memory module to the data log structure on the storage device.

The storage device may be a protected storage device (e.g., protected by a backup server) and/or a non-protected storage device having a file system and the event may be a planned shut down event, an unplanned shut down event and/or a user requested event. The filter module may deposit a collection of data writes of the application server that remain to be recorded in a meta-data registry of the memory module to the data log structure on the storage device coupled to the application server to prevent a data loss during the unplanned shut down event. The data log structure may be created by configuring a portion of the storage device as a dedicated resource available to the memory module to copy the backup data and the data log structure may be a file on the storage device coupled to the application server having the file system.

A paged memory of the memory module may be utilized to buffer the backup data when a storage capacity of the memory module crosses a memory threshold in the continuous backup environment. A write associated to the paged memory may be distinguished from the backup data and/or the data write of the application server at the filter module using the detection algorithm when the paged memory accesses a page file and/or a swap volume on the storage device to buffer the backup data and the write associated to the paged memory may be allowed to pass through the filter module to prevent a system crash and/or the recursion loop that occurs when the filter module makes the redundant copy of the write during the transition of the write associated to the paged memory to the page file and/or the swap volume on the storage device.

The data log structure on the storage device coupled to the application server may be utilized to buffer the backup data when a capacity of the paged memory reaches a threshold value. The backup data may be cycled through a plurality of data log structures on the storage device when a particular data log structure reaches a threshold capacity and a tracking data my be inserted in the memory module to mark the shift from the particular data log structure to another data log structure of the plurality of data log structures to keep track of the backup data in the continuous backup environment when the particular data log structure reaches the threshold capacity.

The filter module may generate the backup data by making a copy of the data write of the application level and/or a physical volume level in an operating system storage stack of the application server. A consistency request may be generated through a consistency module associated to the filter module in the continuous backup environment. The consistency request may be communicated to a backup application programming interface of the application server to prepare the application server for a dynamic backup operation. A marker data may be created to connote a consistency point of the application server and the marker data may be introduced through the filter module into the memory module in the continuous backup environment such that the backup data can be restored to the consistency point using the marker data.

The consistency request may be triggered by a consistency event and the consistency event may be a scheduled event, an unscheduled event and/or a user initiated event. Multiple storage devices coupled to the application server may be quiesced based on the consistency event and the marker data may be applied in a synchronous manner across the multiple storage devices to denote a particular consistency point. The marker data may also be applied across multiple application servers through a network based on the consistency event.

The application write may be analyzed through an algorithm of the filter module to determine a descriptor information associated to the data write of the application server and the marker data may be automatically introduced to indicate an event data based on the descriptor information. The descriptor information may be an application file information, an application status information and/or an application data change information.

A meta-data information associated to the data write of the application server may be extracted to ascertain a location of the data write when the data write of the application server is received by the filter module. The meta-data information of a particular data write may then be compared to the meta-data information of a plurality of data writes to detect an overlapping pattern of the particular data write with other data write in the storage device and a memory optimization may be performed when the storage capacity of the memory module crosses the memory threshold by retaining the particular data write when the particular data write exhibits the overlapping pattern.

The memory optimization may be further enhanced by maintaining only a journal of the meta-data information associated to the data write on the memory module and the journal of meta-data information may be applied to the storage device to locate a data corresponding to the data write of the application server. The meta-data information associated to the data write may be a volume information, an offset information, a length information and/or a data size information. The memory module may retain the particular data write of the application server when the particular data write displays the overlapping pattern with the other data write in the storage device coupled to the application server and the memory module may preserve a registry of the meta-data information associated to the other data write that can be utilized to selectively copy and create the backup data from the other data write in the continuous backup environment.

In another aspect, a network includes an application server having a filter module coupled to a memory module to facilitate a continuous data backup of the application server and to prevent a data loss triggered by an event during the continuous data backup by facilitating transfer of a backup data buffered in the memory module to a data log structure resident on the application server. The network also includes a backup server connected to the application server via the network to store the backup data on a backup storage device coupled to the backup server on a continuous basis. The network may further include a consistency module of the application server to place a flag in the memory module to indicate a data consistency point of an application during a dynamic backup of the application server in a continuous backup environment.

In yet another aspect, an application server in a backup environment includes a memory buffer having a paged memory capable of utilizing a page file and/or a swap volume on the application server to enhance a storage capacity of the memory buffer when the storage capacity crosses a threshold value, a disk buffer on the application server to backup the memory buffer when the memory buffer faces an imminent data loss associated to an event and a filter module to extract a descriptor information from a data write of the application server to position a pointer data in the memory buffer based on an analysis of the descriptor information such that the pointer data corresponds to an event data of the application server.

The application server in the backup environment may further include a consistency module to facilitate interaction between the filter module and a particular application of the application server to coordinate placement of the pointer data in a synchronous fashion across multiple storage devices of the application server to denote a common consistency marker across the multiple storage devices for the particular application. The memory buffer may retain the data write of the application server based on an overlapping pattern analysis of the data write with other data write on a storage device of the application server to optimize the storage capacity of the memory buffer.

A detection algorithm of the filter module may differentiate the data write of the application server from a write of the paged memory and/or a backup data of the memory buffer and the filter module may selectively copy only the data write of the application server to avoid a recursion phenomena caused due to a redundant copy generated from the write of the paged memory and/or the backup data.

The methods, systems, and apparatuses disclosed herein may be implemented in any means for achieving various aspects, and may be executed in a form of a machine readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Method and apparatus to ensure data persistence and consistency in enterprise storage backup systems are disclosed. In the following description, for the purposes of explanation, numerous specific details are set forth in order to provide a thorough understanding of the various embodiments. It will be evident, however to one skilled in the art that the various embodiments may be practiced without these specific details.

Figure 1:
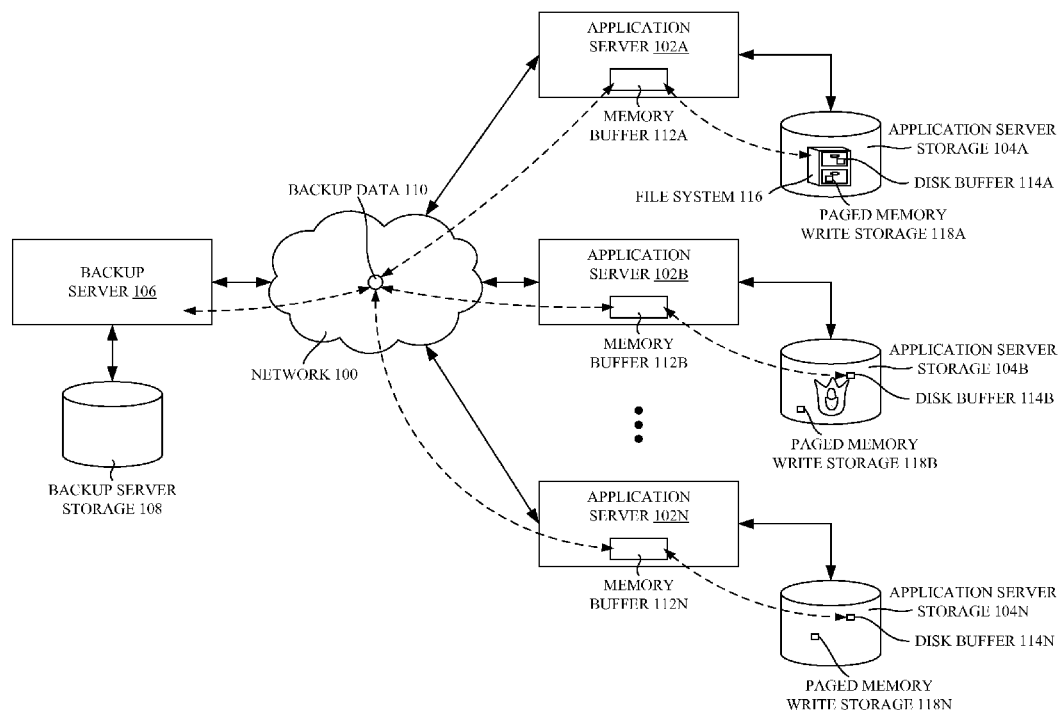
FIG. 1 is a network diagram of an application server communicating a backup data to a backup server through a network and a disk buffer on an application server storage coupled to the application server, according to one embodiment.

An example embodiment provides methods and systems to create a data log structure (e.g., as illustrated by a disk buffer 114 of FIG. 1) on a storage device (e.g., an application server storage 104 of FIG. 1) coupled to an application server to store a backup data (e.g., a backup data 110 of FIG. 1) generated by a filter module (e.g., as illustrated by a filter module 202 of FIG. 2) in a continuous backup environment and to buffer (e.g., provide temporary storage) the backup data generated by the filter module 202 through a memory module (e.g., a memory buffer 112 as illustrated in FIG. 1) that transfers the backup data to the data log structure on the storage device based on an occurrence of an event (e.g., a shutdown event).

In another example embodiment a network (e.g., a network 100 of FIG. 1) includes an application server (e.g., an application server 102 of FIG. 1) having a filter module coupled to a memory module to facilitate a continuous data backup (e.g., in an asynchronous manner) of the application server and to prevent a data loss triggered by an\ event (e.g., a shutdown event) during the continuous data backup by facilitating transfer of a backup data buffered in the memory module to a data log structure resident on the application server and a backup server (e.g., a backup server 106 as shown in FIG. 1) connected to the application server via the network to store the backup data on a backup storage device (e.g., a backup server storage 108 of FIG. 1) coupled to the backup server on a continuous basis.

In an additional example embodiment an application server in a backup environment includes a memory buffer having a paged memory (e.g., a paged memory 218 of FIG. 2) capable of utilizing a page file (e.g., as illustrated by a paged memory write storage 118 of FIG. 1) and/or a swap volume on the application server to enhance a storage capacity of the memory buffer when the storage capacity crosses a threshold value (e.g., a preset value), a disk buffer (e.g., the disk buffer 114 of FIG. 1) on the application server to backup the memory buffer when the memory buffer faces an imminent data loss associated to an event (e.g., a shutdown event) and a filter module (e.g., a filter driver) to extract a descriptor information (e.g., information pertaining to an application write) from a data write of the application server to position a pointer data (e.g., a flag) in the memory buffer based on an analysis of the descriptor information such that the pointer data corresponds to an event data (e.g., status of an application) of the application server.

It will be appreciated that the various embodiments discussed herein may/may not be the same embodiment, and may be grouped into various other embodiments not explicitly disclosed herein.

FIG. 1 is a network diagram of an application server 102 communicating a backup data 110 to a backup server 106 through a network 100 (e.g., an internet network, a wide area network, a local area network, etc.) and to a disk buffer 114 on an application server storage 104 coupled to the application server 102, according to one embodiment. The application server 102 may host a variety of applications (e.g., an enterprise software application such as Oracle®, FoundationIP®, etc.). The application server storage 104 may be a storage device (e.g., a Serial AT A drive, a SCSI drive, a SAS drive, a storage area network, etc.) to store data of the application server 102. In one embodiment, the storage device (e.g., the application server storage 104) may be a protected storage device (e.g., shielded through continuous backup system) and/or a non-protected storage device (e.g., not protected by a backup system) having a file system (e.g., a windows file system, a unix system, etc.). The backup server 106 may receive the backup data 110 through the network 100. The backup server 106 may store the backup data 110 on a backup server storage 108.

In one embodiment, a network (e.g.; the network 100) includes a backup server (e.g., the backup server 106) connected to the application server (e.g., the application server 102) via the network to store the backup data (e.g., the backup data 110) on a backup storage device (e.g., the backup server storage 108) coupled to the backup server (e.g., the backup server 106) on a continuous basis (e.g.; a continuous asynchronous backup system). The backup server storage 108 may be a storage device (e.g., a Serial ATA drive, a SCSI drive, a SAS drive, a storage area network, etc.) connected to the backup server 106. The backup data 110 may be a copy of a data write (e.g., a backup copy of the data write) of the application server 102 stored on the backup server storage 108. The data write may be a write of the application server (e.g., an application write, a system write, etc.) to the application server storage 104.

In one embodiment a filter module (e.g., a filter module 202 of FIG. 2) may generate the backup data 110 by making a copy of the data write of the application server 102. The application server 102 may include a memory buffer 112, according to one embodiment. The memory buffer 112 may be a memory storage (e.g., a random access memory, flash memory, etc.) to buffer the backup data 110 between the application server 102 and the backup server 106. For example, the backup data 110 may have to be temporarily stored in the memory storage due to certain intermittent transmission constraints (e.g., bandwidth constraints, slow backup server, internet traffic, etc.) between the application server 102 and the backup server 106 in an asynchronous backup environment. The backup data 110 may then be conveniently transmitted to the backup server 106 from the memory storage depending on the transmission constraints.

The application server storage 104 may include a disk buffer 114, a file system 116 and a paged memory write storage 118. The disk buffer 114 may be used to store data (e.g., backup data, system data, etc.) of the application server 102. In one embodiment, the disk buffer 114 may be a data log structure created by configuring a portion of the storage device (e.g., part of the Serial ATA drive, the SCSI drive, the SAS drive, the storage area network, etc.) as a dedicated resource (e.g., committed to the memory buffer) available on the memory module to copy the backup data 110. The data log structure may be a file (e.g., a file on a Windows operating system, a Macintosh operating system, etc.) on the storage device coupled to the application server (e.g., the application server 102) having the file system (e.g. a Windows file system, a UNIX file system, etc.) according to another embodiment. The file system 116 may be a file structure of an operating system (e.g., a Windows operating system, a UNIX operating system, a Linux operating system, etc.).

In one embodiment, a network (e.g., an internet network, a wide area network, a local area network, etc.) includes an application server (e.g., the application server 102) having a filter module (e.g., a filter module 202 of FIG. 2) coupled to a memory module (e.g., the memory buffer 112) to facilitate a continuous data backup of the application server and to prevent a data loss (e.g., loss of backup data 110) triggered by an event (e.g., a shutdown event, a capacity overflow event, etc.) during the continuous data backup by facilitating transfer of a backup data (e.g., the backup data 110) buffered in the memory module to a data log structure (e.g., the disk buffer 114) resident on the application server. For example, during a planned shutdown event and/or a user requested event the memory buffer 112 (e.g., random access memory, flash memory, etc.) may move the data stored on the memory buffer 112 to the disk buffer 114 (e.g., a file on an operating system of the application server) to prevent a potential data loss (e.g., caused due to loss of power in the flash memory).

In one embodiment, a paged memory (e.g., a paged memory 218 of FIG. 2) of the memory module (e.g., the memory buffer 112) may be utilized to buffer the backup data (e.g., the backup data 110) when a storage capacity of the memory module (e.g., capacity of the random access memory, flash memory, etc.) crosses a threshold (e.g., a preset value, a defined value) in the continuous backup environment. For example, once the capacity of the physical memory (e.g., the random access memory, the flash memory, etc.) is utilized, the paged memory (e.g., a virtual memory) may be used to store and/or buffer the backup data (e.g., the backup data 110). The paged memory write storage 118 may be used to store data (e.g., backup data) associated to a write by the paged memory 218 (e.g., the paged memory 218 of FIG. 2) of the memory buffer 112.

In another embodiment, the data log structure (e.g., the disk buffer 114) on the storage device coupled to the application server (e.g., the application server storage 104) may be utilized to buffer the backup data (e.g., the backup data 110) when a capacity of the paged memory (e.g., the paged memory 218) reaches a threshold value (e.g., capacity if full), the backup data may be cycled (e.g., rotated) through a plurality of data log structures (e.g., multiple disk buffers) on the storage device when a particular data log structure reaches a threshold capacity and a tracking data may be inserted in the memory module (e.g., to keep track of the backup data) to mark the shift from the particular data log structure to another data log structure of the plurality of data log structures when the particular data log structure reaches the threshold capacity. For example, when the capacity of the paged memory is saturated, the backup data may be sent to a particular disk buffer on the application server storage. The backup data may further be cycled between multiple disk buffers to prevent data loss (e.g., backup data loss) once the particular disk buffer gets completely occupied.

Figure 2:
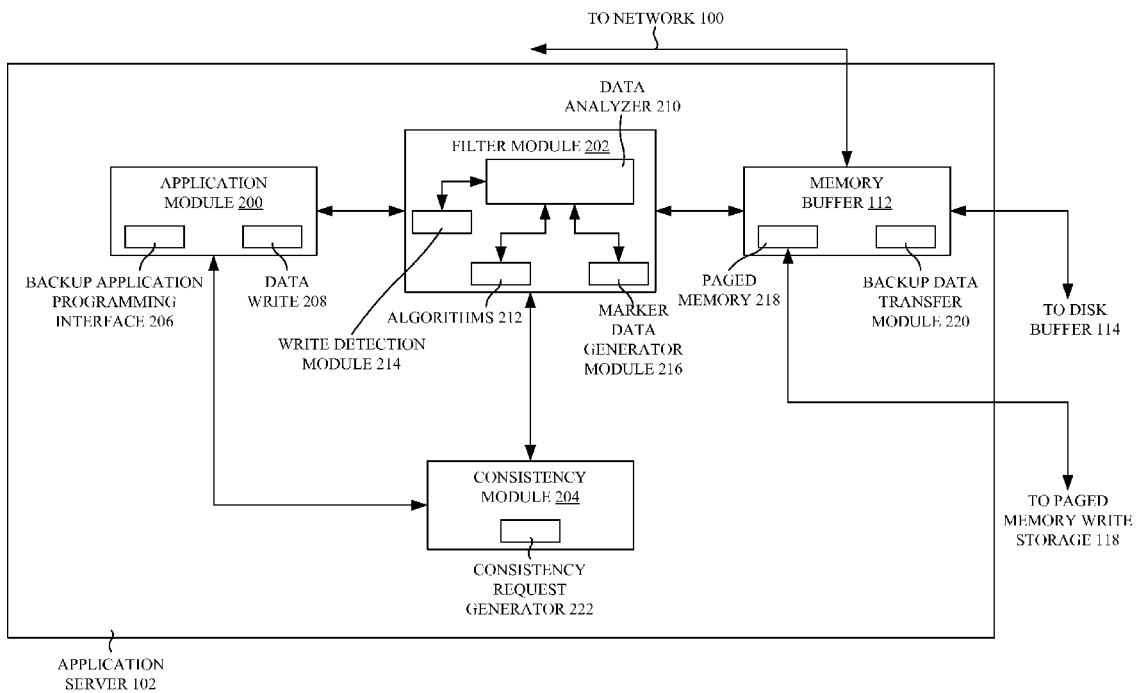
FIG. 2 is an exploded view of the application server of FIG. 1, according to one embodiment.

FIG. 2 is an exploded view of the application server 102 of FIG. 1 having an application module 200, a filter module 202, the memory buffer 112 and/or a consistency module 204, according to one embodiment. The application module 200 may control applications (e.g., an enterprise software application such as Oracle®, FoundationIP®, etc.) hosted on the application server 102. The filter module 202 (e.g., a filter driver) may be used to receive data from the application module 200 and make a copy of the data to create a backup copy (e.g., the backup data 110 of FIG. 1) of the data to be sent to the backup server 106 via the memory buffer 112. The filter module 202 may be applied at a logical volume level and/or a physical volume level (e.g., physical drive level) in an operating system storage stack (e.g., a stack comprising of application level, a file system level, a logical volume manager level and/or a disk drive level) of the application server (e.g., the application server 102 of FIG. 1), according to one embodiment.

The memory buffer 112 may receive the backup data 110 from the filter module 202 and may act as an intermediary storage for the backup data 110 before sending it to the backup server 106 (e.g., the backup server 106 of FIG. 1) through the network (e.g., the network 100 of FIG. 1) in a continuous backup system. The consistency module 204 may communicate with the filter module 202 and/or the application module 200 to facilitate a consistency operation (e.g., an application consistency operation) during a dynamic backup of the application server 102 based on a consistency event (e.g., application shutdown, scheduled maintenance, etc.) to ensure consistency in the backup data (e.g., the backup data 110 of FIG. 1).

The application module may include a backup application programming interface 206 and/or a data write 208, according to one embodiment. The backup application programming interface 206 may be used to coordinate the consistency operation (e.g., complete all open transactions, flush caches, freeze data writes, etc.) during a consistency event as per the directions of the consistency module 204. The data write may be data (e.g., application data) written to the application server storage (e.g., the application server storage 104 of FIG. 1).

The filter module 202 may include a data analyzer 210, algorithms 212, a write detection module 214 and/or a marker data generator module 216, according to one embodiment. The data analyzer 210 may be used to analyze and/or process (e.g., by using the processor 802 of FIG. 8) data (e.g., data write) of the application server (e.g., the application server 102). The algorithms 212 may be a collection of algorithms (e.g., detection algorithms, information extraction algorithms, etc.) that may be referenced and/or used by the data analyzer 210. The write detection module 214 may be used to detect the origin of a data write (e.g., originated in application server, originated in filter module, originated in paged memory, etc.). The marker data generator module 216 may be used to generate a marker data (e.g., a bookmark, flag, etc.) that can be inserted by the filter module 202 in the memory buffer (e.g., the memory buffer 112) and can be used as a reference point.

In one embodiment, the backup data (e.g., the backup data 110 of FIG. 1) generated by the filter module may be differentiated from a data write of the application server (e.g., the application server 102 of FIG. 1) using a detection algorithm of the filter module when the memory module (e.g., the memory buffer 112) transfers the backup data to the data log structure (e.g., due to saturation of memory capacity, shutdown event, etc.) and the backup data may be allowed to permeate (e.g., pass) through the filter module to prevent a recursion loop (e.g., an infinite loop) that arises when the filter module makes a redundant copy of the backup data during a transition of the backup data from the memory module to the data log structure (e.g., the disk buffer 114 of FIG. 1) on the storage device (e.g., the application storage server 104 as illustrated in FIG. 1).

Particularly the data analyzer 210 may receive the data write 208 from the application module 200. The data analyzer 210 may then reference the write detection module 214 and/or the algorithms 212 (e.g., the detection algorithms) to differentiate the data write of the application server from the backup data (e.g., the backup data 110) and/or the write associated to the paged memory (e.g., the paged memory 218). The data analyzer may then selectively make a copy of only the data write of the application server and allow the backup data and/or the write associated to the paged memory to pass through the filter module 202 to prevent a recursion loop. Recursion loop is best understood with reference to FIG. 3 and FIG. 4 as will later be described.

In one embodiment, a meta-data information associated to the data write of the application server (e.g., the application server 102 of FIG. 1) may be extracted to ascertain a location of the data write (e.g., the location of the data write on the storage drive) when the data write of the application server is received by the filter module (e.g., the filter module 202) and the meta-data information of a particular data write may be compared to the meta-data information of a plurality of data writes to detect an overlapping pattern (e.g., overlapping of data writes on the storage device) of the particular data write with other data write in the storage device. A memory optimization may hence be performed when the storage capacity of the memory module (e.g., the memory buffer 112 of FIG. 1) crosses the memory threshold (e.g., a preset value) by retaining the particular data write when the particular data write exhibits the overlapping pattern.

Specifically the data analyzer 210 may reference the algorithms 212 to analyze and/or extract a meta-data information of the data write (e.g., information pertaining to the location of the data write). The data analyzer 210 may then compare this information with the location information of data writes on the storage device (e.g., the application server storage 104 of FIG. 1) to determine if there is an overlap. The data write may only be retained in the memory buffer if there is a possible overlap, else the data write is sent to the application server storage (e.g., the application server storage 104 of FIG. 1). The meta-data information associated to the data write may be a volume information (e.g., volume C, volume D, etc.), an offset information (e.g., location on the volume), a length information (e.g., length of the write) and/or a data size information (e.g., size of data accompanying the data write) according to one embodiment.

Moreover, in another embodiment, the memory optimization may be enhanced by maintaining only a journal (e.g., a register) of the meta-data information associated to the data write on the memory module (e.g., the memory buffer 112) and the journal of the meta-data information may be applied to the storage device (e.g., the application server storage 104) to locate a data corresponding to the data write of the application server (e.g., the application server 102)

Specifically, the data analyzer 210 after analyzing the data write for overlapping pattern, creates a registry of meta-data information (e.g., the location information) in the memory buffer of all data writes that do not exhibit the overlapping pattern (e.g., data writes on the application server storage 104). The registry of meta-data information may then be used by the filter module 202 to create a backup copy of the data writes on the application server storage and send it to the backup server (e.g., the backup server 106 of FIG. 1) via the network (e.g., the network 100 as illustrated in FIG. 1) in the continuous backup environment (e.g., the asynchronous backup system).

The memory buffer 112 may include the paged memory 218 and/or the backup data transfer module 220, according to one embodiment. The paged memory 218 may be used to buffer the backup data (e.g., the backup data 110 of FIG. 1) when the non paged memory (e.g., the flash memory, random access memory, etc.) reaches a threshold value (e.g., a preset value, capacity saturation, etc.). Write associated to the paged memory 218 may be stored on the paged memory write storage (e.g., the paged memory write storage 118 of FIG. 1). The paged memory write storage may be a page file (e.g., Windows page file, a file on an operating system, etc.) and/or a swap volume (e.g., a disk drive) on the application server storage (e.g., the application server storage 104 of FIG. 1). The filter module 202 ensures that the write associated to the paged memory is not duplicated (e.g., copied by the filter driver) to prevent a recursion loop (e.g., by using the write detection module 214). Additional details will be best understood with reference to FIG. 3 and FIG. 4.

The backup data transfer module 220 may be used to transfer the backup data (e.g., the backup data 110 of FIG. 1) from the memory buffer 112 to the disk buffer (e.g., the disk buffer 114 as illustrated in FIG. 1) during a data loss event (e.g., a shutdown event). In one embodiment a data log structure (e.g., as illustrated by the disk buffer 114 of FIG. 1) is created on a storage device coupled to an application server (e.g., the application server storage 104) having a file system (e.g., a Windows file system) to store a backup data (e.g., the backup data 110) generated by a filter module in a continuous backup environment and the backup data is buffered by the filter module (e.g., the filter module 202) through a memory module (e.g., the memory buffer 112) that transfers the backup data to the data log structure on the storage device based on an occurrence of an event (e.g., a potential data loss event).

Particularly the backup data transfer module 220 may detect the event (e.g., the potential data loss event) and trigger the transfer of backup data to the disk buffer. The event may be a planned shutdown event (e.g., a proper shutdown of the operating system), an unplanned shutdown event (e.g., a power loss) and/or a user requested event (e.g., as per client request), according to one embodiment.

The consistency module 204 may include a consistency request generator 222, according to one embodiment. The consistency request generator 222 may generate a consistency request based on a consistency event. In one embodiment, the consistency request may be triggered by a consistency event and the consistency event may be a scheduled event (e.g., periodic programmed request), an unscheduled event and a user initiated event (e.g., as per client request). In another embodiment, a consistency request may be generated through a consistency module (e.g., the consistency module 204) associated to the filter module (e.g., the filter module 202) in the continuous backup environment.

The consistency request may be communicated to a backup application programming interface (e.g., the backup application programming interface 206) of the application server (e.g., the application server 102 of FIG. 1) to prepare the application server for a dynamic backup operation. A marker data may be created to connote a consistency point (e.g., to indicate the consistency point) of the application server and the marker data may be introduced through the filter module into the memory module (e.g., the memory buffer 112 of FIG. 1) in the continuous backup environment such that the backup data (e.g., the backup data on the backup server 106 of FIG. 1) can be restored to the consistency point using the marker data (e.g., through a restoration operation).

Particularly the consistency module 204 may communicate with the backup application programming interface 206 to prepare a particular application for a consistency operation. The backup application programming interface 206 may prepare and/or queisce the data of the particular application (e.g., complete all transactions, flush caches, etc.). The backup application programming interface 206 may then inform the consistency module 204 when the particular application is prepared for the consistency operation. The consistency module 204 may in turn communicate with the marker data generator module 216 of the filter module 202 to generate a marker data. The marker data may then be introduced into the memory buffer (e.g., the memory buffer 112 of FIG. 1) to denote a consistency point of the particular application.

In one embodiment, multiple storage devices (e.g., multiple physical drives) coupled to the application server may be queisced based on the consistency event and the marker data (e.g., the marker data generated by the marker data generator module 216) may be applied in a synchronous manner across the multiple storage devices to denote a particular consistency point (e.g., consistency point for the particular application). The marker data may also be applied across multiple application servers (e.g., similar to the application server 102 of FIG. 1) through a network (e.g., the network 100 of FIG. 1) based on the consistency event.

In another embodiment, the data write of he application server (e.g., the application server 102) may be analyzed through an algorithm (e.g., information extraction algorithm) of the filter module (e.g., the filter driver) to determine a descriptor information associated to the data write of the application server and the marker data may be automatically introduced to indicate an event data (e.g., an application defrag event, a file save event, etc.) based on the descriptor information. Specifically the data analyzer 210 may reference the algorithms 212 of the filter module 202 and determine the descriptor information associated to the data write. Based on the analysis of the descriptor information, the data analyzer 210 may request the marker data generator module 216 to generate a marker data and introduce the marker data into the memory buffer (e.g., the memory buffer 112 of FIG. 1) to indicate and/or signify a particular event (e.g., an important event from a backup perspective). The descriptor information may be an application file information, an application status information and/or an application data change information, according to one embodiment.

Figure 3A:
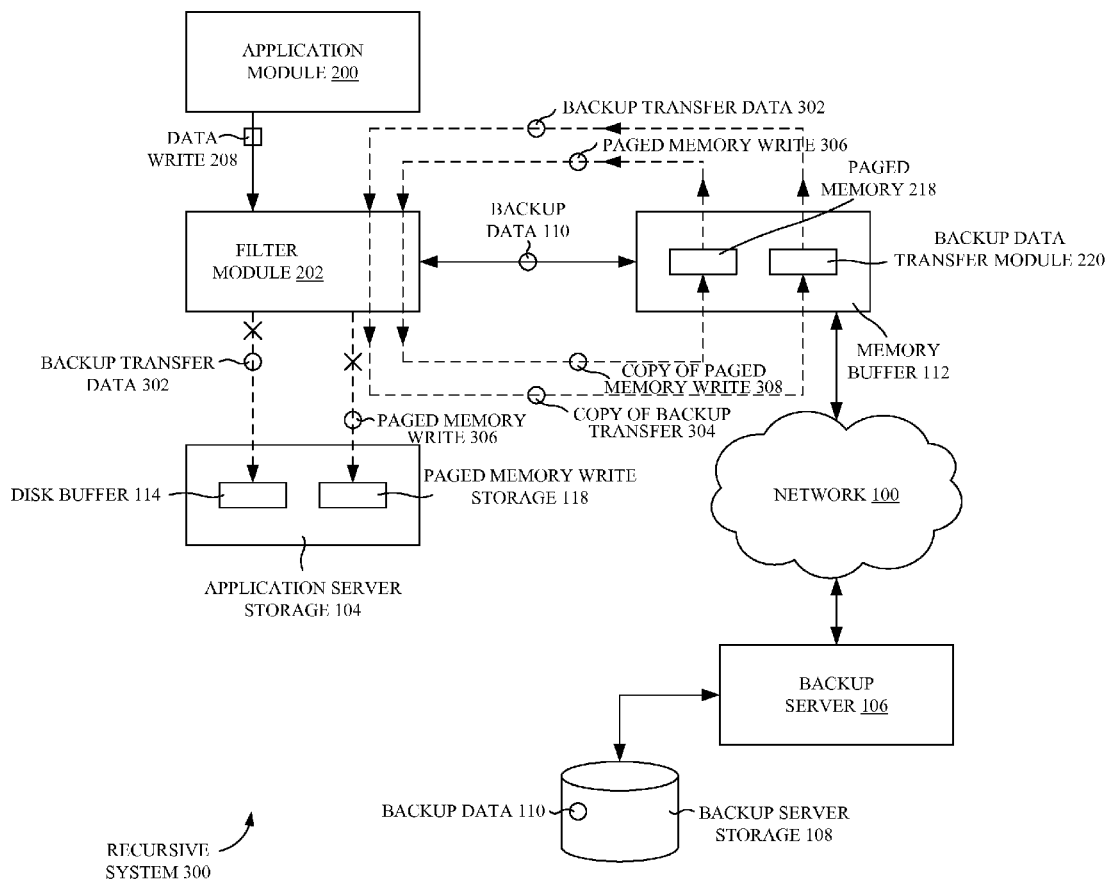
FIG. 3A-3B are block diagrams to illustrate a comparison between a recursive system and a non-recursive system when writing data to the application server, according to one embodiment.

FIG. 3A is a block diagram to illustrate a recursive system 300 that comes into play when the memory buffer (e.g., the memory buffer 112) and/or the paged memory (e.g., the paged memory 218) attempts to write data to a file (e.g., the disk buffer 114, the paged memory write storage 118, etc.) on the file system (e.g., a Windows file system) of the application server, according to one embodiment. The application module 200 may send a data write 208 to the application server storage 104. The filter module 202 may intercept the data write 208 (e.g., at the file system level, the logical volume level, etc. in an operating system storage stack). The filter module 202 may create a backup data (e.g., the backup data 110) by making a copy of the data write of the application server (e.g., the application server 102). The backup data may be copied to the memory buffer.

A potential data loss event may trigger the backup data transfer module 220 to transfer the backup data to a disk buffer. The backup data transfer module 220 may attempt to send a backup transfer data 302 to the disk buffer 114. The backup transfer data 302 may again be intercepted by the filter module 202 that may proceed to make a copy of the backup transfer data 302 to generate a copy of backup transfer 304. The copy of backup transfer 304 may be a redundant data (e.g., since it was copied earlier from the data write to create the backup data). The copy of backup transfer 304 may be sent back to the memory buffer (e.g., the memory buffer 112) to complete a recursion loop 310.

Similarly, the paged memory 218 of the memory buffer may attempt to utilize a paged memory write storage to write data when the capacity of the memory (e.g., the flash memory, random access memory, etc.) reaches a certain threshold (e.g., a preset value). As described earlier, a paged memory write 306 associated to the paged memory 218 may also be intercepted by the filter module 202 to create a copy of paged memory write 308 that may in turn be sent back to the memory buffer 112. This may again lead to the recursion loop 310 and/or a system crash.

Figure 3B:
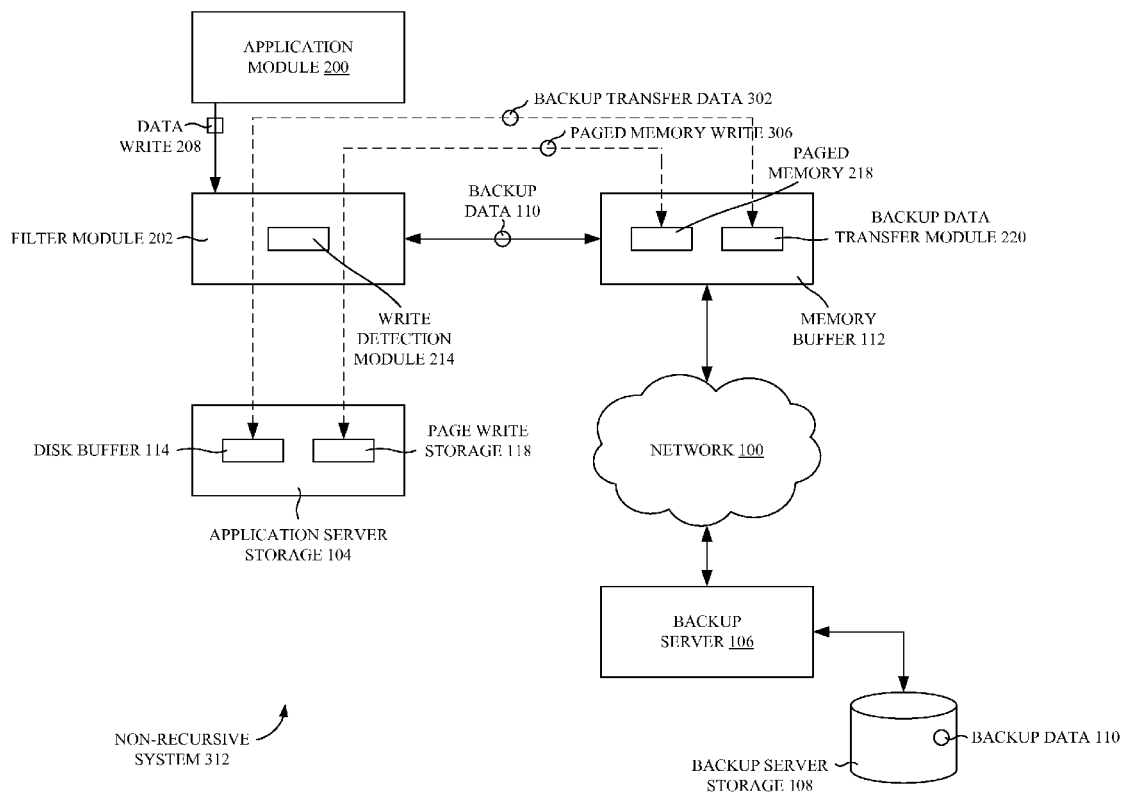

FIG. 3B is a block diagram to illustrate a non-recursive system 312 that allows the memory buffer (e.g., the memory buffer 112 of FIG. 1) and/or the paged memory (e.g., the paged memory 218 of FIG. 2) to write data to a file (e.g., the disk buffer 114, the page file, etc.) on a file system of the application server (e.g., the application server 102 of FIG. 1), according to one embodiment. As described in FIG. 3A, a data write of the application server may be intercepted by the filter module (e.g., the filter module 202 of FIG. 2). The filter module 202 may create a copy of the data write (e.g., as described in FIG. 2) to generate a backup data (e.g., the backup data 110 of FIG. 1). The backup data may be copied onto the memory buffer. The memory buffer may attempt to write the backup transfer data 302 to a file (e.g., the disk buffer 114) on the file system of the application server (e.g., due to space constraints, potential data loss event, etc.).

The backup transfer data 302 may be intercepted by the filter module 202. The presence of a write detection module (e.g., the write detection module 214 of FIG. 2) may allow the filter module to differentiate the data write of the application server from the backup data (e.g., the backup transfer data). The filter module may then allow the backup transfer data 302 to pass through the filter module to the disk buffer 114 on the application server storage (e.g., the application server storage 104 of FIG. 1).

Similarly, the write detection module 214 may prevent the recursion of the paged memory write 306. In one embodiment, a write associated to the paged memory (e.g., the paged memory write 306) may be distinguished (e.g., by using the write detection module 214) from the backup data (e.g., the backup data 110) and/or the data write of the application server at the filter module (e.g., the filter module 202) using the detection algorithm when the paged memory (e.g., the paged memory 218) accesses a page file (e.g., the paged memory write storage 118 of FIG. 1) and/or a swap volume on the storage device (e.g., the application server storage 104) to buffer the backup data.

The write associated to the paged memory may be allowed to pass through the filter module to prevent a system crash and/or the recursion loop (e.g., the recursion loop 310 as described earlier) that occurs when the filter module makes a redundant copy of the write (e.g., the copy of paged memory write 308) during a transition of the write associated to the paged memory to the page file and/or the swap volume on the storage device.

Figure 4:
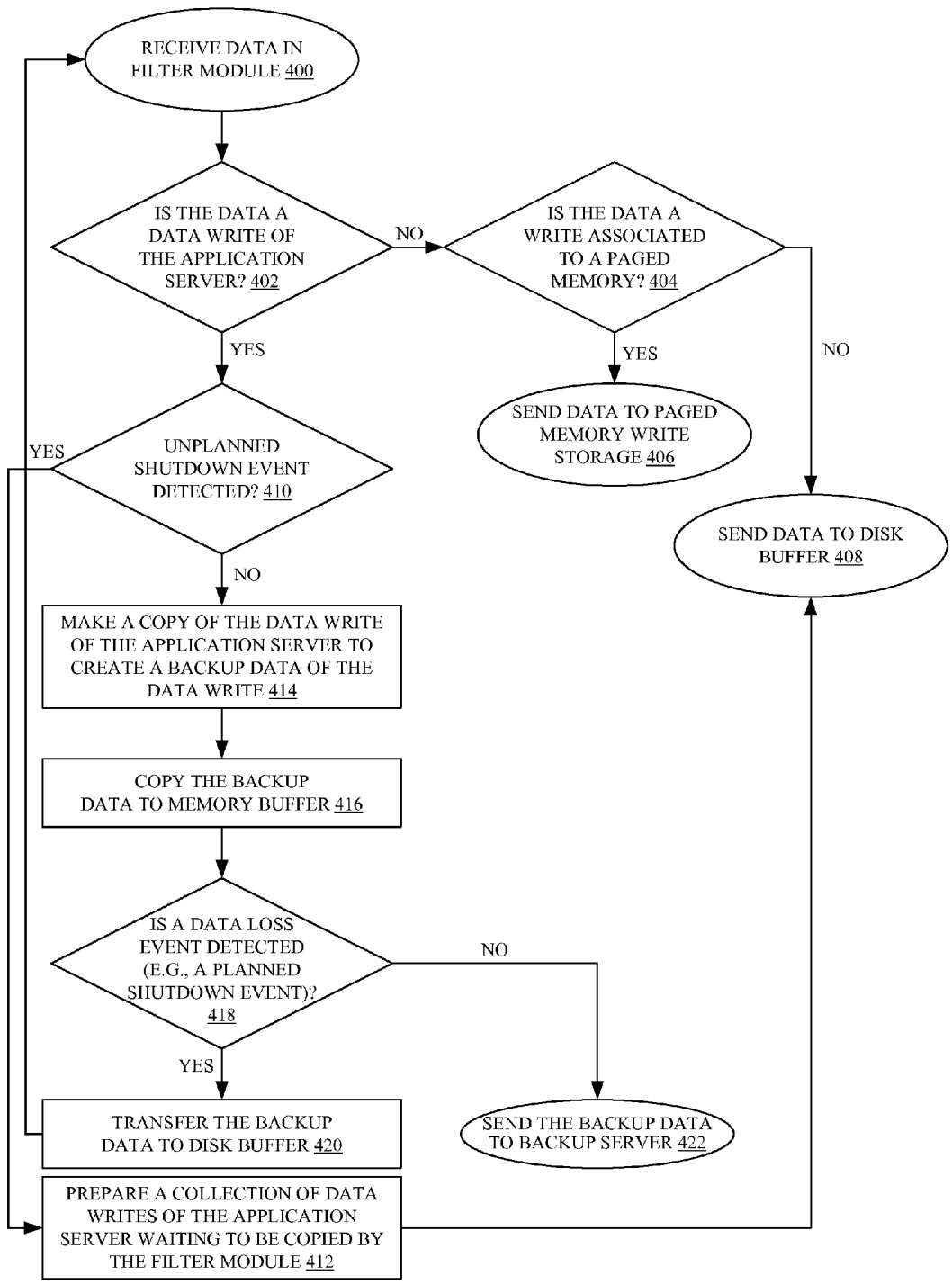
FIG. 4 is a process flow chart to differentiate and process data through a filter module to avoid recursion, according to one embodiment.

FIG. 4 is a process flow chart to differentiate and process data through a filter module of FIG. 2 to avoid recursion, according to one embodiment. In operation 400, data (e.g., data write of the application server, write associated to page memory, backup data) may be received in the filter module (e.g., the filter module 202 of FIG. 2). In operation 402, it may be determined whether the data is a data write of the application server (e.g., the application server 102 of FIG. 1). In operation 404, the data is not a data write of the application server and it may be further determined whether the data is a write associated to a paged memory (e.g., the paged memory 218 of FIG. 2). In operation 406, the data is determined to be a write associated to the paged memory and the data may be sent to the paged memory write storage (e.g., the paged memory write storage 118 of FIG. 1). In operation 408, it is determined that the data is not a write associated to the paged memory and that the data is a backup data (e.g., the backup data 110 of FIG. 1) and the backup data may be sent to disk buffer (e.g., the disk buffer 114 of FIG. 1).

In operation 410, it is determined that the data is a data write of the application server and it may be further determined whether an unplanned shutdown event is detected. In operation 412, it is determined that an unplanned shutdown event is detected and a collection of data writes of the application server waiting to be copied by the filter module (e.g., the filter driver) may be prepared. The collection of data writes may then be sent to the disk buffer (e.g., the disk buffer 114 of FIG. 1). In one embodiment, the filter module (e.g., the filter module 202 of FIG. 2) deposits a collection of data writes of the application server (e.g., the application server 102) that remain to be recorded in a meta-data registry (e.g., a journal of meta-data) of the memory module (e.g., the memory buffer 112 of FIG. 1) to the data log structure (e.g., the disk buffer 114) on the storage device coupled to the application server (e.g., the application server storage 104 as illustrated in FIG. 1) to prevent a data loss during the unplanned shutdown event (e.g., a power loss).

In operation 414, no unplanned shutdown event is detected and a copy of the data write of the application server may be made to create a backup data (e.g., the backup data 110 of FIG. 1) of the data write. In operation 416, the backup data may be copied to the memory buffer. In operation 418, it may be determined whether a data loss event (e.g., a planned shutdown event, a user requested event, etc.) is detected. In operation 420, it is determined that the data loss event is detected and the backup data may be transferred to the disk buffer. The backup data may then be received by the filter module (e.g., in operation 400) since the filter module intercepts the backup data during its transition through the different levels of the operating system storage stack (e.g., the application level, the file system level, the logical volume level, etc.). In operation 422, it is determined that there is no data loss event detected and the backup data may be sent to the backup server (e.g., the backup server 106 as illustrated in FIG. 1).

Figure 5:
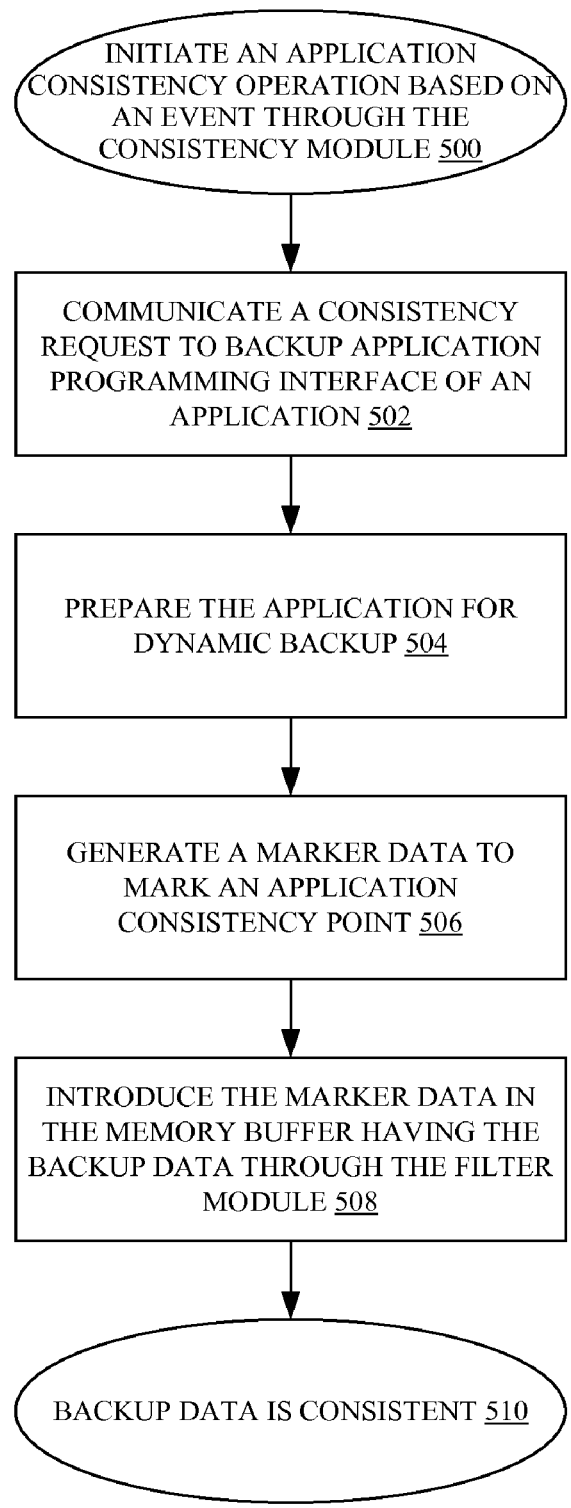
FIG. 5 is a process flow to ensure backup data consistency by placement of a consistency marker facilitated by a consistency module, according to one embodiment.

FIG. 5 is a process flow to ensure backup data (e.g., the backup data 110) consistency by placement of a consistency marker (e.g., a marker data) facilitated by a consistency module (e.g., the consistency module 204 of FIG. 2), according to one embodiment. In operation 500, an application consistency operation may be initiated based on an event (e.g., a user requested event) through the consistency module (e.g., as illustrated by the consistency request generator 222 of FIG. 2). In operation 502, the consistency request may be communicated to the backup application programming interface (e.g., the backup application programming interface 206 of FIG. 2) of an application (e.g., an enterprise software application such as Oracle®, FoundationIP®, etc.).

In operation 504, the application may be prepared for dynamic backup. In operation 506, a marker data may be generated (e.g., through the marker data generator module 216 of FIG. 2) to mark an application consistency point. In operation 508, the marker data may be introduced in the memory buffer (e.g., the memory buffer 112) having the backup data (e.g., the backup data 110) through the filter module (e.g., as described earlier in FIG. 2). In operation 510, it may be determined that the backup data (e.g., the backup data 110) is consistent (e.g., recoverable to that point).

Figure 6:
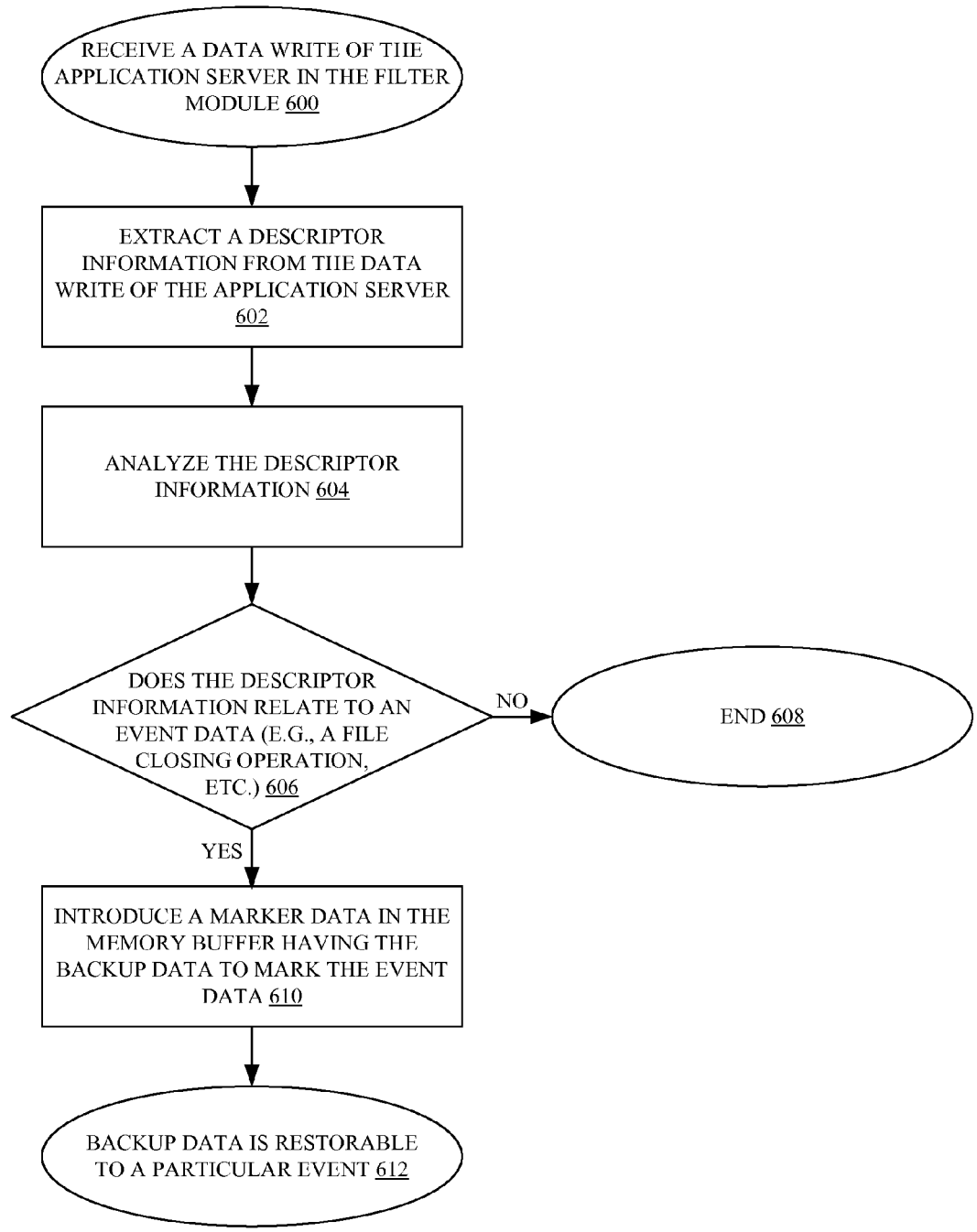
FIG. 6 is a process flow to ensure restorability of the backup data to a particular event based on a data write analysis, according to one embodiment.

FIG. 6 is a process flow to ensure restorability of a backup data (e.g., the backup data 110) to a particular event (e.g., a defrag event) based on the data write analysis, according to one embodiment. In operation 600, a data write of the application server (e.g., the application server 102 of FIG. 1) may be received in the filter module. In operation 602, a descriptor information may be extracted from the data write of the application server (e.g., by using the algorithms 212 of FIG. 2). In operation 604, the descriptor information may be analyzed (e.g., by using the data analyzer 210 as described in FIG. 2). In operation 606, it may be determined whether the descriptor information relates to an event data (e.g., a file closing event, etc.). In operation 608, it is determined that the descriptor information does not relate to an event data and the process is stopped.

In operation 610, it is determined that the descriptor information relates to an event data and a marker data may be introduced in the memory buffer having the backup data to mark the event data. In one embodiment, the filter module (e.g., the filter module 202 of FIG. 2) extracts an application descriptor information from a data write of the application server (e.g., the application server 102) to position a pointer data (e.g., a marker data) in the memory buffer based on an analysis of the application descriptor information such that the pointer data corresponds to an event data (e.g., a defrag event, a file closing event, etc.) of the application server. In operation 612, it may be determined that the backup data is restorable to a particular event.

Figure 7:
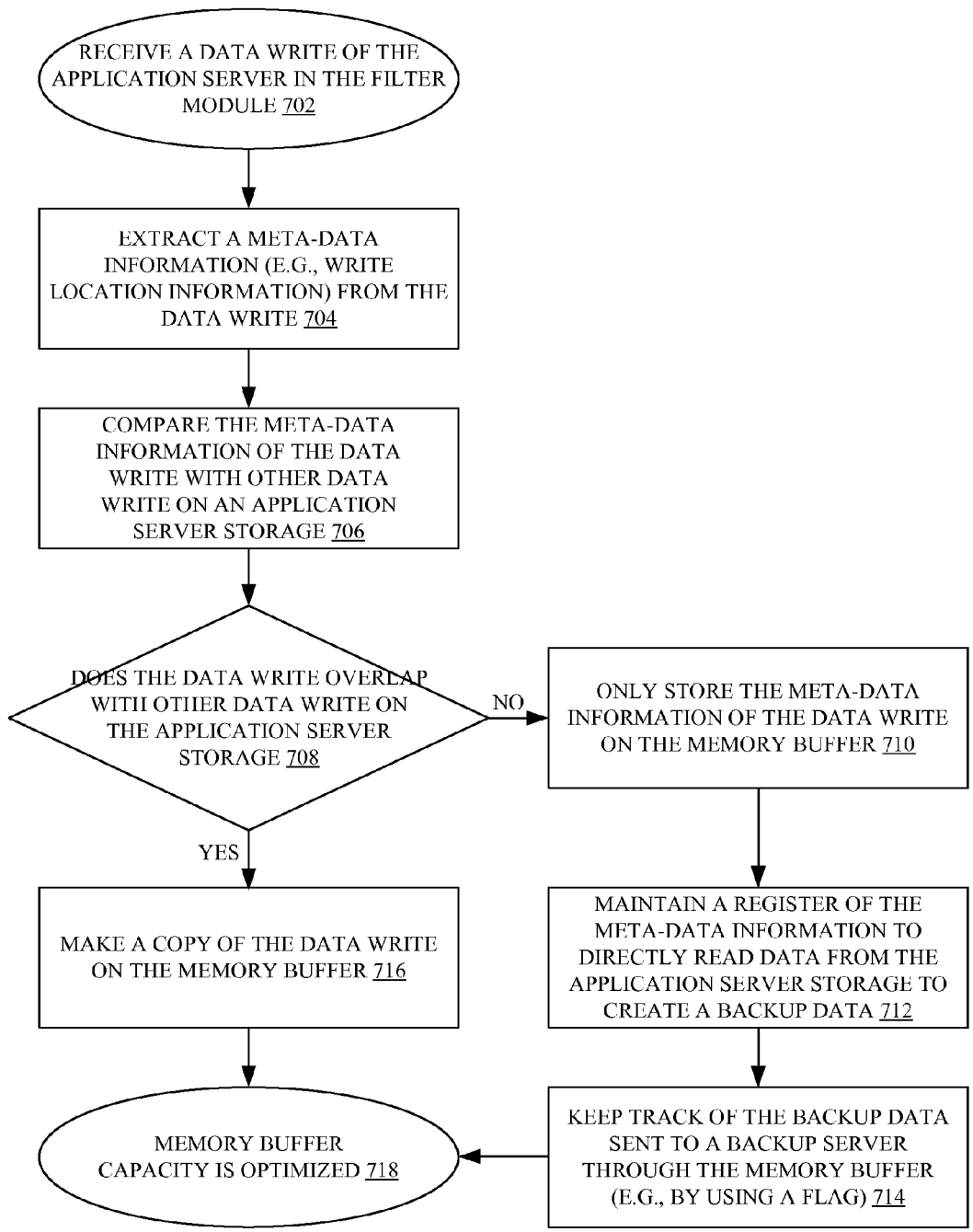
FIG. 7 is a process flow to optimize a memory buffer of the application server of FIG. 1, according to one embodiment.

FIG. 7 is a process flow to optimize a memory buffer (e.g., the memory buffer 112) of the application server of FIG. 1, according to one embodiment. In operation 700, a data write of the application server (e.g., the application server 102) is received in the filter module (e.g., the filter module 202 of FIG. 2). In operation 702, a meta-data information (e.g., data write location information on the storage device) may be extracted from the data write. In operation 706, the meta-data information of the data write may be compared with other data write (e.g., using the data analyzer 210 as illustrated in FIG. 2) on an application server storage (e.g., the application server storage 104). In operation 708, it may determined whether the data write overlaps with other data write on the application server storage.

In operation 710, it is determined that the data write does not overlap with other data writes, and only the meta-data information (e.g., location information) of the data write is stored on the memory buffer (e.g., the memory buffer 112 of FIG. 1). In one embodiment, the memory module may retain a particular data write of the application server (e.g., the application server 102) when the particular data write displays the overlapping pattern with the other data write in the storage device coupled to the application server (e.g., the application server storage 104) and the memory module may preserve a registry of the meta-data information (e.g., a journal) associated to the other data write that can be utilized to selectively copy and create the backup data (e.g., the backup data 110) from the other data write in the continuous backup environment.

In operation 712, a register of the meta-data information may be maintained to directly read data from the application server storage to create a backup data. In operation 714, track of the backup data sent to the backup server (e.g., the backup server 106 of FIG. 1) may be kept through the memory buffer (e.g., by using a flag to mark the backup data that has been communicated to the backup server 106). In operation 716, it is determined that the data write does overlap with other data writes and a copy of the data write may be made on the memory buffer (e.g., the memory buffer 112 of FIG. 1). In operation 718, it may be determined that the memory buffer capacity (e.g., storage space) is optimized.

Figure 8:
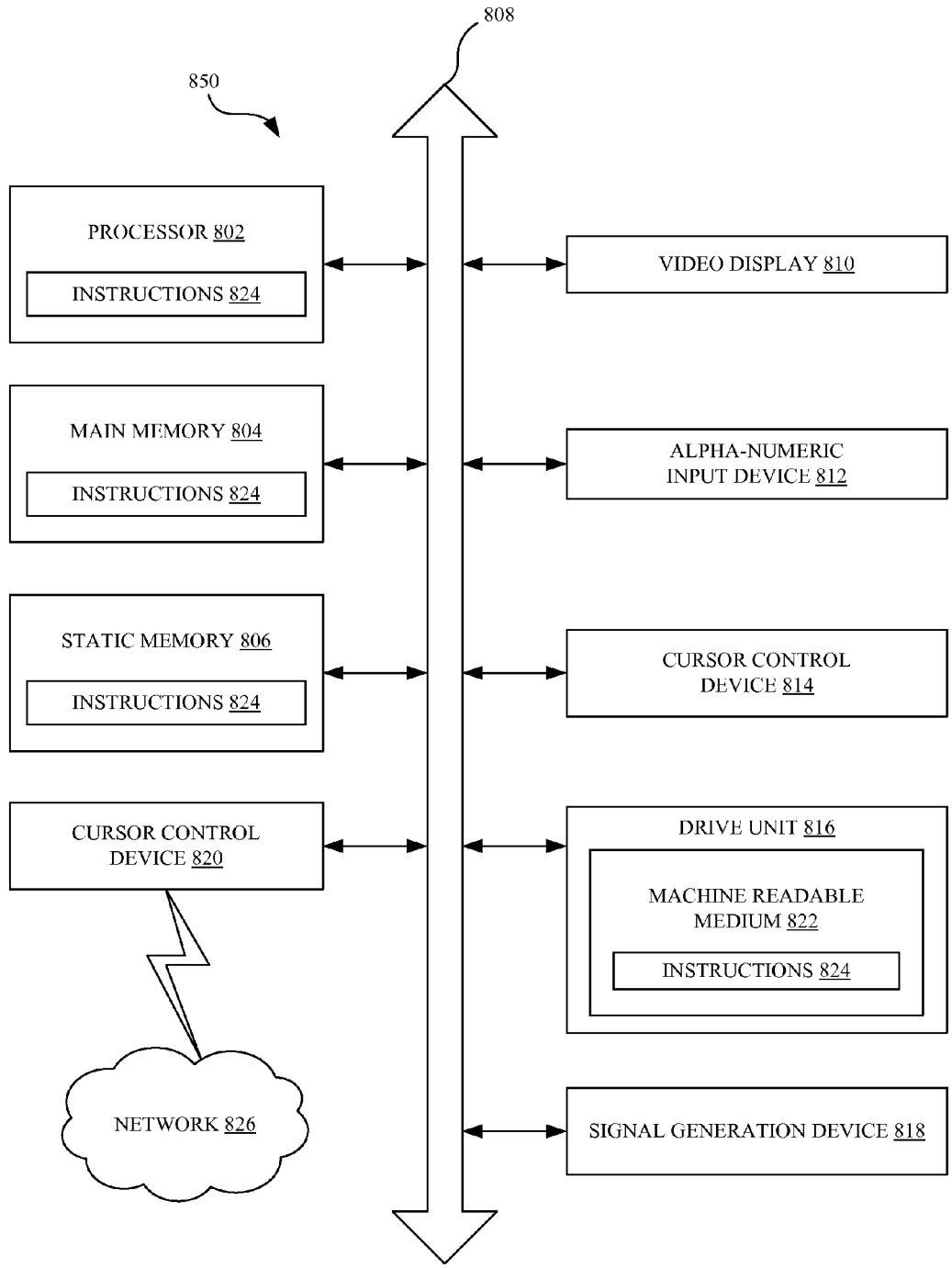
FIG. 8 is a diagrammatic representation of a machine in the form of a data processing system within which a set of instructions, for causing the machine to perform anyone or more of the methodologies discussed herein, may be executed, according to one embodiment.

FIG. 8 shows a diagrammatic representation of machine in the example form of a computer system 800 within which a set of instructions, for causing the machine to perform anyone or more of the methodologies discussed herein, may be executed. In various embodiments, the machine operates as a standalone device and/or may be connected (e.g., networked) to other machines. In a networked deployment, the machine may operate in the capacity of a server and/or a client machine in server-client network environment, and/or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch and/or bridge, an embedded system and/or any machine capable of executing a set of instructions (sequential and/or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The example computer system 800 includes a processor 802 (e.g., a central processing unit (CPU) a graphics processing unit (GPU) and/or both), a main memory 804 and a static memory 806, which communicate with each other via a bus 808. The computer system 800 may further include a video display unit 810 (e.g., a liquid crystal display (LCD) and/or a cathode ray tube (CRT)). The computer system 800 also includes an alphanumeric input device 812 (e.g., a keyboard), a cursor control device 814 (e.g., a mouse), a disk drive unit 816, a signal generation device 818 (e.g., a speaker) and a network interface device 820.

The disk drive unit 816 includes a machine-readable medium 822 on which is stored one or more sets of instructions (e.g., software 824) embodying anyone or more of the methodologies and/or functions described herein. The software 824 may also reside, completely and/or at least partially, within the main memory 804 and/or within the processor 802 during execution thereof by the computer system 800, the main memory 804 and the processor 802 also constituting machine-readable media.

The software 824 may further be transmitted and/or received over a network 826 via the network interface device 820. While the machine-readable medium 822 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform anyone or more of the methodologies of the various embodiments. The term "machine-readable medium" shall accordingly be taken to include, but not be limited to, solid-state memories, optical and magnetic media, and carrier wave signals.

Figure 9:
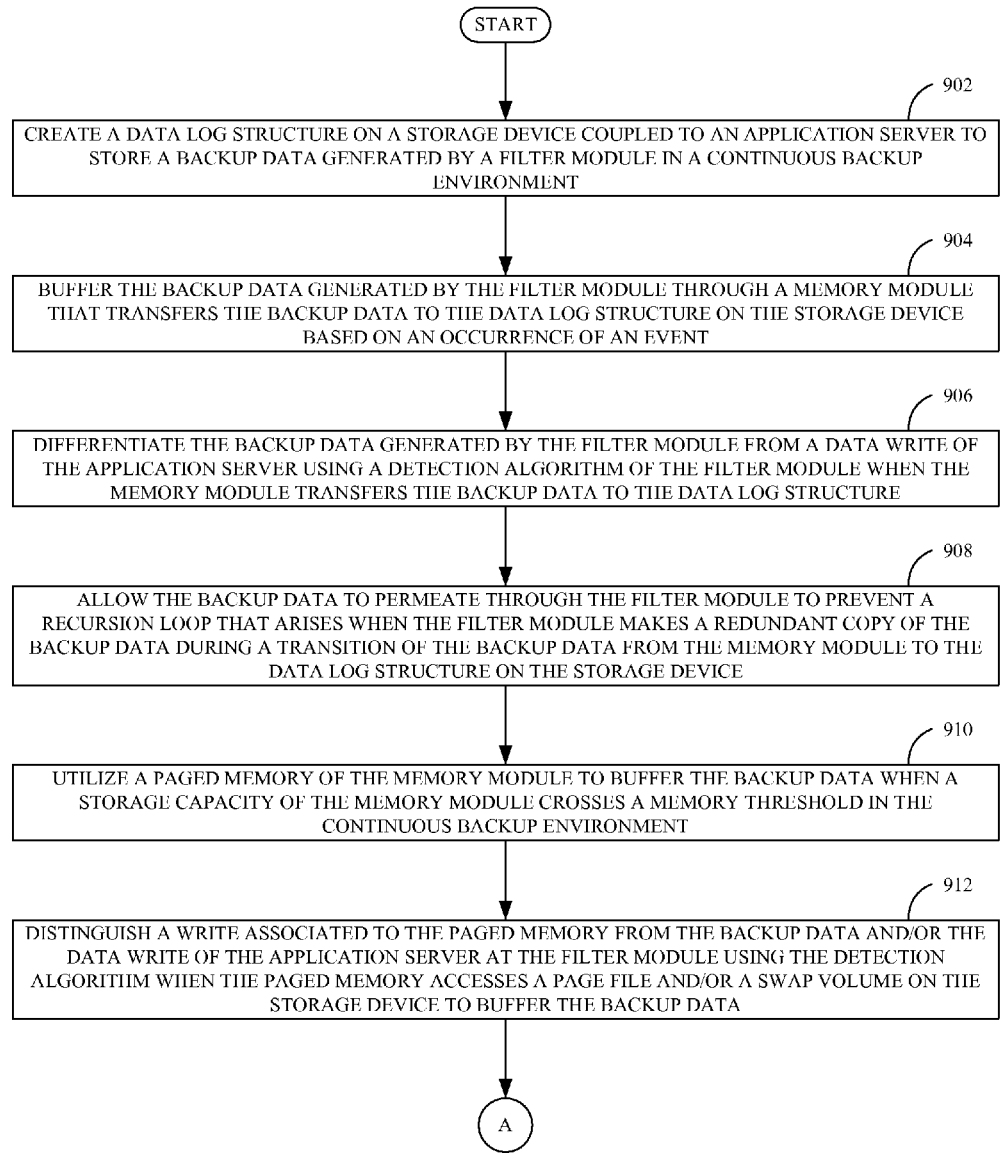
FIG. 9 is a process flow to ensure data persistence through transfer of a backup data from the memory buffer of FIG. 7 to a disk buffer on the application server, according to one embodiment.

FIG. 9 is a flow chart illustrating a method to ensure data persistence through transfer of a backup data from the memory buffer of FIG. 7 to a disk buffer on the application server, according to one embodiment. In operation 902, a data log structure (e.g., as illustrated by the disk buffer 114 of FIG. 1) may be created on a storage device coupled to an application server (e.g., the application sever 102) to store a backup data (e.g., the backup data 110 of FIG. 1) generated by a filter module in a continuous backup environment. In operation 904, the backup data generated by the filter module (e.g., the filter module 202 of FIG. 2) may be buffered through a memory module (e.g., the memory buffer 112 of FIG. 1) that transfers the backup data to the data log structure on the storage device (e.g., the application server storage 104) based on an occurrence of an event.

In operation 906, the backup data generated by the filter module may be differentiated from a data write of the application server using a detection algorithm of the filter module when the memory module transfers the backup data to the data log structure (e.g., as described in FIG. 2). In operation 908, the backup data may be allowed to permeate (e.g., pass) through the filter module to prevent a recursion loop (e.g., the recursion loop 310 of FIG. 3A) that arises when the filter module makes a redundant copy of the backup data during a transition of the backup data from the memory module to the data log structure (e.g., the disk buffer 114 of FIG. 1) on the storage device (e.g., as described earlier in FIG. 3A and FIG. 3D).

In operation 910, a paged memory (e.g., the paged memory 218 of FIG. 2) of the memory module may be utilized to buffer the backup data when a storage capacity of the memory module crosses a memory threshold (e.g., a preset value) in the continuous backup environment. In operation 912, a write associated to the paged memory may be distinguished from the backup data and/or the data write of the application server at the filter module using the detection algorithm when the paged memory accesses a page file (e.g., a Windows page file) and/or a swap volume on the storage device to buffer the backup data (e.g., the backup data 110).

Figure 10:
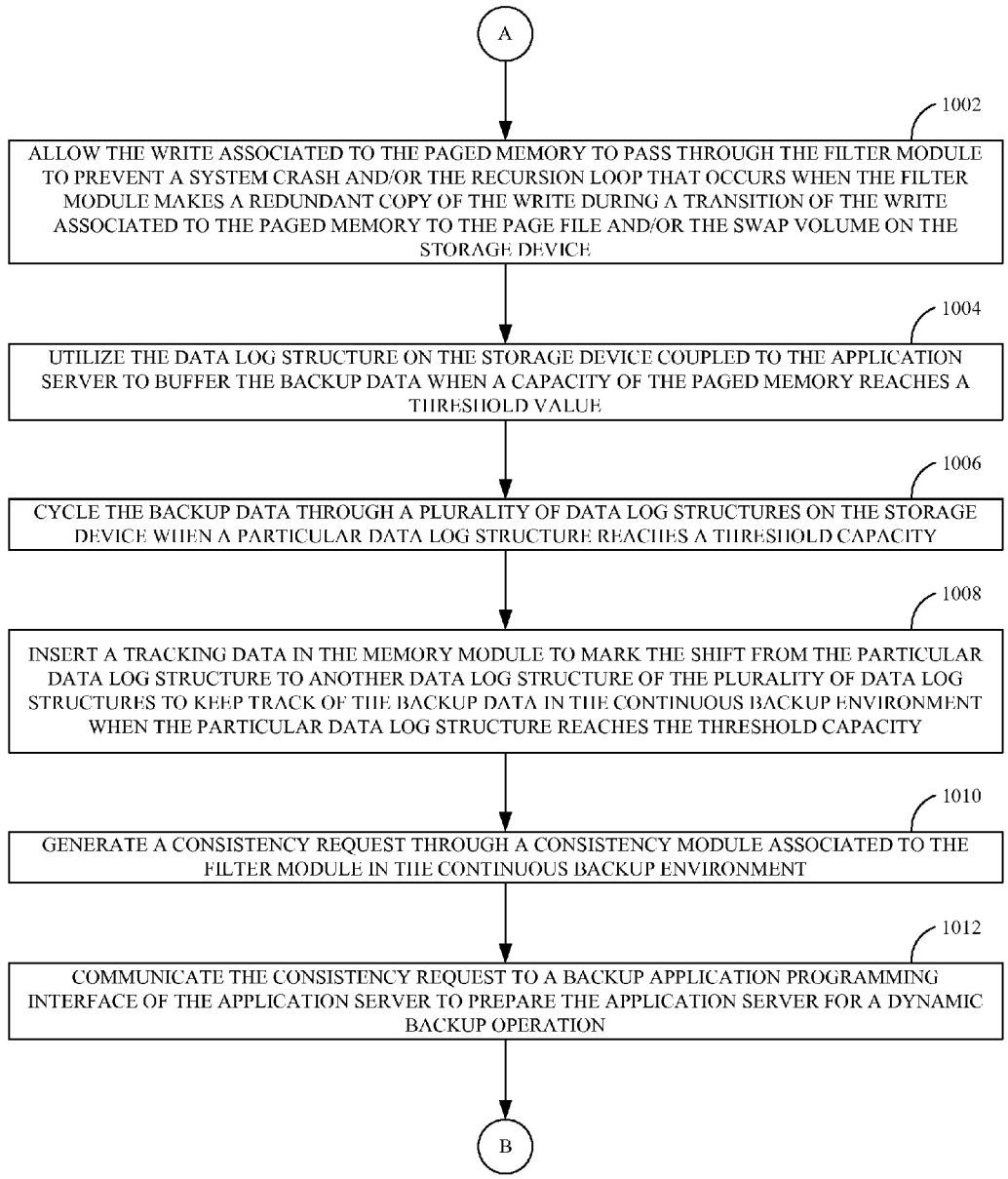
FIG. 10 is a process diagram that illustrates further the operations of FIG. 9, according to one embodiment.

FIG. 10 is a process diagram that describes further the operations of FIG. 9, according to one embodiment. FIG. 10 begins with a 'circle A' that connotes a continuation from operation 912 of FIG. 9 (e.g., FIG. 9 concludes with the 'circle A'). First in operation 1002, the write associated to the paged memory may be allowed to pass through the filter module to prevent a system crash and/or the recursion loop that occurs when the filter module makes a redundant copy of the write during a transition of the write associated to the paged memory to the page file and/or the swap volume on the storage device (e.g., as described in FIG. 3A and FIG. 3D).

In operation 1004, the data log structure (e.g., the disk buffer 114) on the storage device coupled to the application server (e.g., the application server storage 104 of FIG. 1) may be utilized to buffer the backup data (e.g., the backup data 110) when a capacity of the paged memory reaches a threshold value (e.g., a pre-determined value). In operation 1006, the backup data may be cycled through a plurality of data log structures on the storage device when a particular data log structure reaches a threshold capacity. In operation 1008, a tracking data (e.g., a flag) may be inserted in the memory module to mark the shift from the particular data log structure to another data log structure of the plurality of data log structures to keep track of the backup data (e.g., through the flag) in the continuous backup environment when the particular data log structure reaches the threshold capacity.

In operation 1010, a consistency request (e.g., using the consistency request generator 222 of FIG. 2) may be generated through a consistency module (e.g., the consistency module 204 of FIG. 2) associated to the filter module in the continuous backup environment. In operation 1012, the consistency request may be communicated to a backup application programming interface (e.g., the backup application programming interface 206 of FIG. 2) of the application server to prepare the application server for a dynamic backup operation (e.g., as described in FIG. 5).

Figure 11:
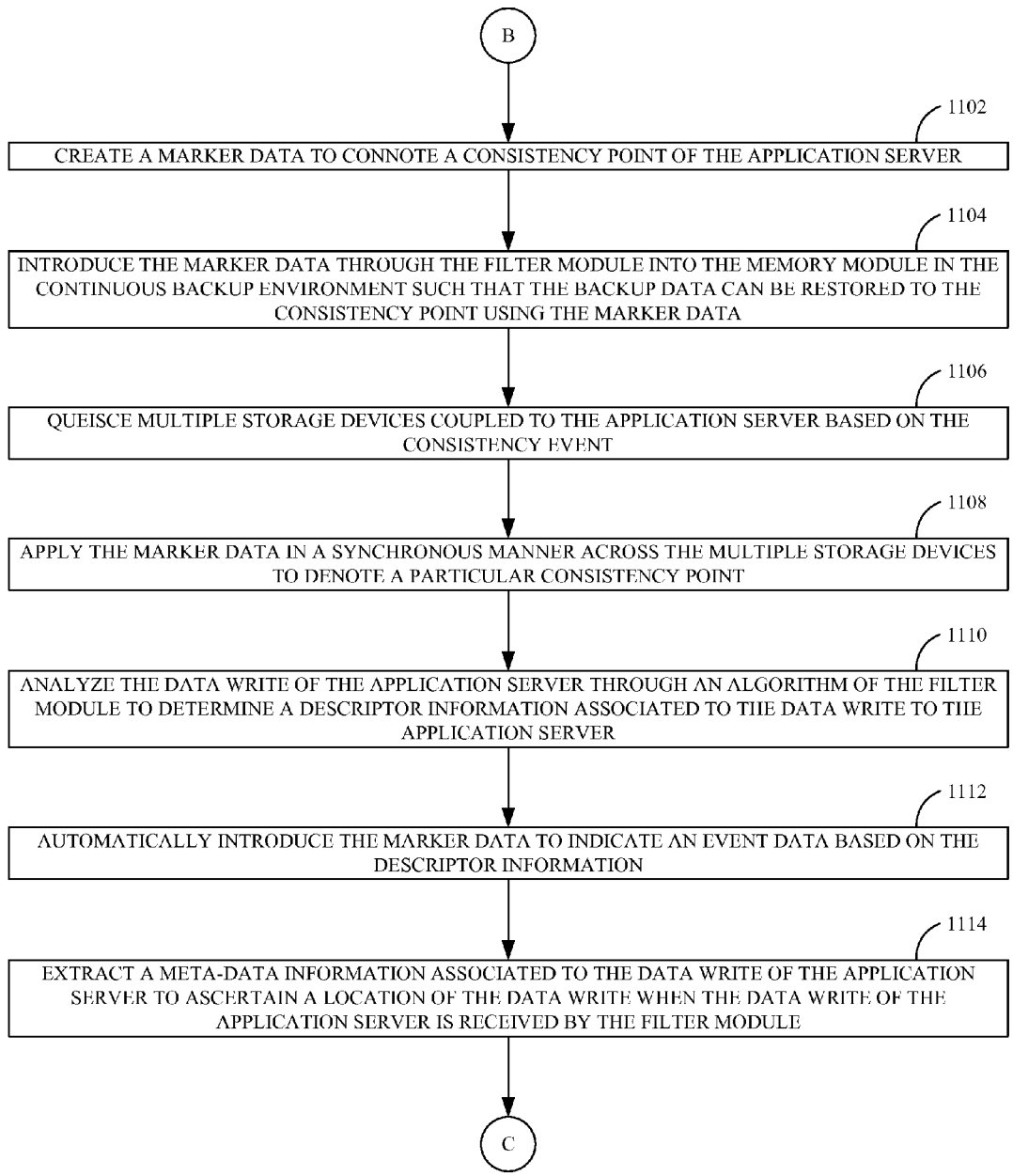
FIG. 11 is a process diagram that illustrates further the operations of FIG. 10, according to one embodiment.

FIG. 11 is a process diagram that describes further the operations of FIG. 10, according to one embodiment. FIG. 11 begins with a 'circle B' that connotes a continuation from operation 1012 of FIG. 10 (e.g., FIG. 10 concludes with the 'circle B'). In operation 1102, a marker data may be created (e.g., by using the marker data generator module 216 of FIG. 2) to connote a consistency point of the application server. In operation 1104, the marker data may be introduced through the filter module into the memory module in the continuous backup environment such that the backup data can be restored to the consistency point using the marker data (e.g., as described in FIG. 5).

In operation 1106, multiple storage devices coupled to the application server may be queisced based on the consistency event. In operation 1108, the marker data may be applied in a synchronous manner across the multiple storage devices (e.g., multiple physical drives connected to an application server) to denote a particular consistency point. In operation 1110, the data write of the application server may be analyzed through an algorithm of the filter module to determine a descriptor information associated to the data write of the application server (e.g., by using the data analyzer 210 of FIG. 2). In operation 1112, the marker data may be automatically introduced to indicate an event data (e.g., an application defrag event, a file save event, etc.) based on the descriptor information (e.g., as described in FIG. 6). In operation 1114, a meta-data information associated to the data write of the application server may be extracted to ascertain a location of the data write (e.g., location on the application server storage) when the data write of the application server is received by the filter module.

Figure 12:
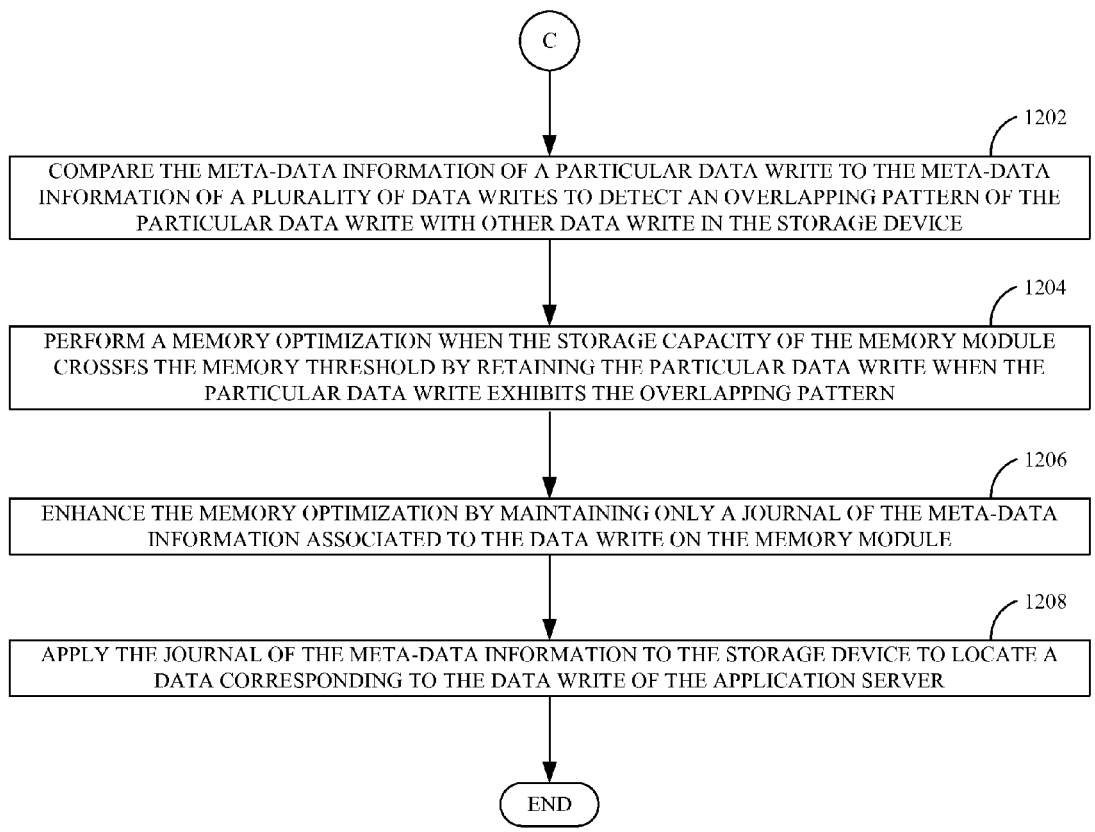
FIG. 12 is a process diagram that illustrates further the operation of FIG. 11, according to one embodiment.

FIG. 12 is a process diagram that describes further the operations of FIG. 11, according to one embodiment. FIG. 12 begins with a 'circle C' that connotes a continuation from operation 1114 of FIG. 11 (e.g., FIG. 11 concludes with the 'circle C'). First in operation 1202, the meta-data information of a particular data write may be compared to the meta-data information of a plurality of data writes to detect an overlapping pattern of the particular data write with other data write in the storage device (e.g., as described in the process flow of FIG. 7).

In operation 1204, a memory optimization may be performed when the storage capacity of the memory module crosses the memory threshold (e.g., memory saturation, preset value, etc.) by retaining the particular data write when the particular data write exhibits the overlapping pattern (e.g., overlapping with other data writes in the application server storage). Next in operation 1206, the memory optimization may be enhanced by maintaining only a journal of the meta-data information associated to the data write on the memory module. In operation 1208, the journal of the meta-data information may be applied to the storage device to locate a data corresponding to the data write (e.g., to generate a backup data) of the application server (e.g., as described in FIG. 7).

Figure 13:
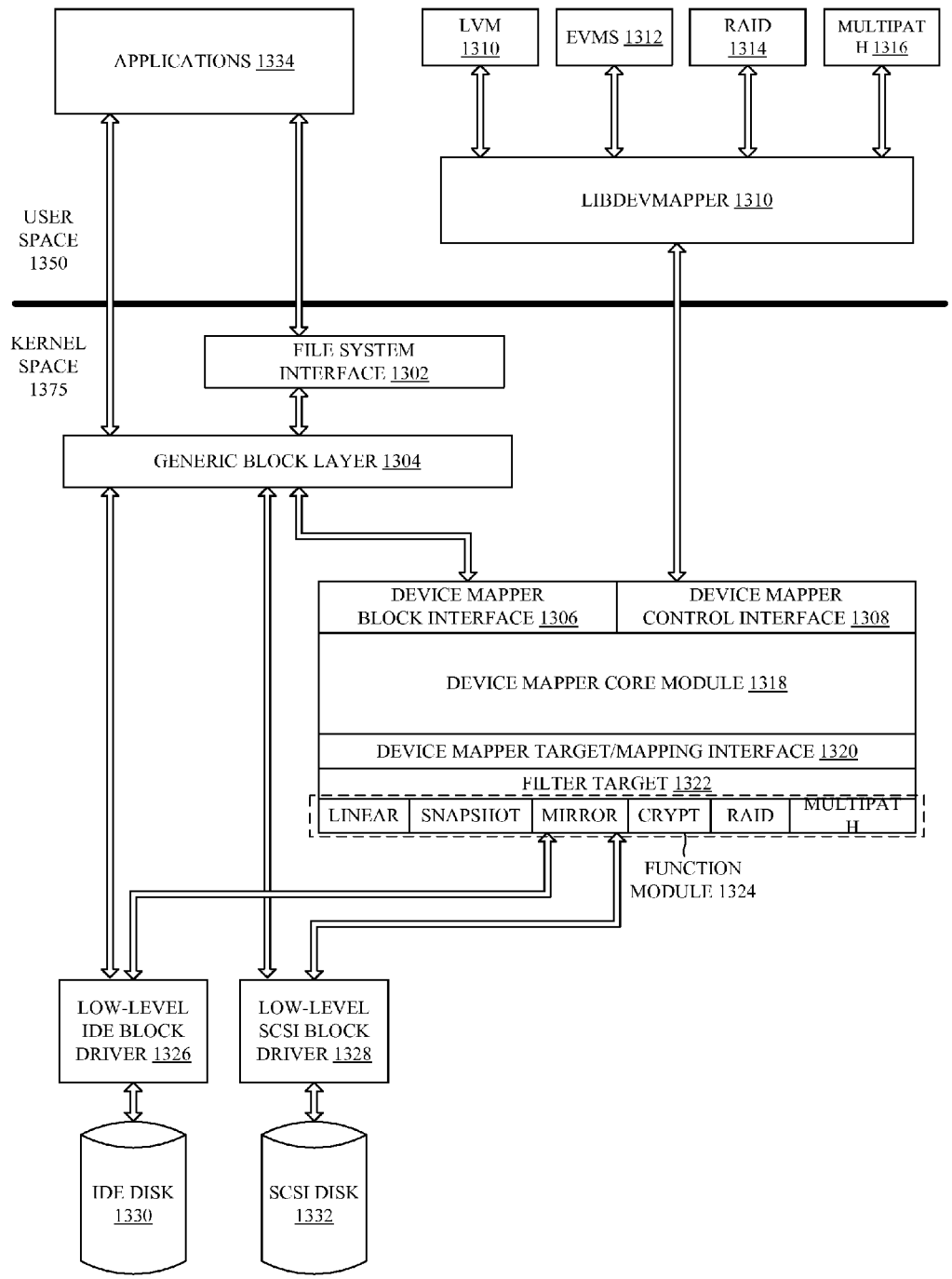
FIG. 13 is a schematic view illustrating a driver mapper architecture of the application server in which the filter module is implemented, according to one or more embodiments.

FIG. 13 is a schematic view illustrating a driver mapper architecture of the application server 102 in which the filter module 202 is implemented, according to one or more embodiments.

A user space 1350 may be a front-end that supports front end applications. The filter module 202 may be implemented in kernel space 1375. The file system interface 1302 may be an interface that intakes from a user (e.g., developer, tester, etc.). A generic block layer module 1304 may handle requests for all block devices in the system. In one or more embodiments, the generic block layer module 1304 may enable the kernel to put data buffers in high memory, enable data to be put directly into the user mode address space without copying into memory first, and enables management of logical volumes. A device mapper block interface 1306 may enable mapping of data blocks. A device mapper control interface 1308 may be an interface that communicates with a libdevmapper 1310 to provide mapper controls using functions from the libdevmapper 1310. A device mapper core module 1318 may include functionalities that perform filtering operation. A device mapper target/mapping interface 1320 may be a module that decides/maps a target device for performing backup operations. A filter target 1322 may be an interface that communicates the data to a target device though low-level block drivers.

In one or more embodiments, the target devices may be an additional storage device configured for backup operation. The data may be communicated to the target devices in a form that is prescribed for backup. For example, a function module 1324 may perform a specified operation (e.g., linear, snapshot, minoring, crypt, Redundant Array Of Independent Disks (RAID), mutipath) based on requirements of the storage device. A low-level integrated development environment (IDE) block driver 1326 may manage a IDE storage device 1330. Similarly, a low-level SCSI block drivers 1328 may manage a SCSI storage disk 1332. The IDE disk 1330 and the SCSI disk 1332 may be the target devices. The libdevmapper 1310 may provide tools to manage devices (e.g., Logical Volume Manager (LVM), Enterprise Volume Manager System (EVMS), RAID, mutipath) by instructing the device-mapper kernel regarding an operation to be performed. A LVM 1336 may manage disk drives and/or mass-storage device. The EVMS 1312 may be an integrated volume management software used to manage storage systems. The RAID 1314 may be a method of managing storage systems. The multipath 1316 may be a technique for communicating data to a destination via more than paths. Applications 1334 may be front-end applications that involve file operations.

The filter module 202 may be implemented in the mapper driver architecture. The filter module may generate the backup data 110 by making a copy of the data write of the application server 102. In one or more embodiments, the filter module 202 may be used to track the changes on a disk. In one or more embodiments, the device mapper may be used to load a filter target for filtering a block device. Similarly, the device mapper may be used to unload the filter driver when it doesn't need to be filtered. Alternate approaches may require kernel tweaking and reboot after kernel tweaking. Applications remain un-affected while stacking/un-stacking a filter target. In addition, the device mapper may provide a highly modular framework for stacking block device filter module 202s in the kernel and communicating with these drivers from a front end space through a well defined Application Program Interface (API).

In one or more embodiments, the filter module 202 may be referred to as target drivers. The target drivers may interact with the device mapper framework through a well defined kernel interface. The target drivers may add value by filtering and/or redirecting read and write block I/O requests, directed to a mapped device to one or more target devices. The device mapper framework may promote a clean separation of policy and mechanism between user and kernel space respectively. In addition, the device mapper framework may support the creation of a variety of services based on adding value to a dispatching and/or completion handling of block I/O requests where the bulk of policy and control logic resides in user space. In one or more embodiments, the filter module 202 to redirect the block I/O request may be kernel resident.

While the device mapper registers with the kernel as a block device driver, target drivers in turn register callbacks with the device mapper for initializing and terminating target device metadata, suspending and resuming I/O on a mapped device, filtering I/O dispatch and I/P completion, and retrieving mapped device configuration and status information. The device mapper may also provides key services, (e.g., I/O suspension/resumption, bio cloning, and the propagation of I/O resource restrictions), for use by all target drivers to facilitate the flow of I/O dispatch and I/O completion events through the device mapper framework. The device mapper framework may itself a component driver within the outermost generic_make_request framework for block devices. The generic_make_request framework also provides for stacking block device filter module 202s. Therefore, it may be architecturally possible to stack device mapper drivers both above and below multidisk drivers for the same target device.

The device mapper may processes all read and write block I/O requests which pass through the block I/O subsystem's generic_make_request and/or submit_bio interfaces and is directed to a mapped device. Architectural symmetry may be achieved for I/O dispatch and I/O completion handling since I/O completion handling within the device mapper framework is done in the inverse order of I/O dispatch. All read/write bios may be treated as asynchronous I/O within all portions of the block I/O subsystem. This design may result in separate, asynchronous and inversely ordered code paths through both the generic_make_request and the device mapper frameworks for both I/O dispatch and completion processing. A major impact of this design is that it is not necessary to process either an I/O dispatch or completion either immediately or in the same context in which they are first seen.

The device mapper may dispatch bios recursively from root node to leaf node through the tree of the device mapper mapped and target devices in process context. Each level of recursion moves down one level of the device tree from the root mapped device to one or more leaf target nodes. At each level, the device mapper may clone a single bio to one or more bios depending on target mapping information previously pushed into the kernel for each mapped device in the I/O stack since a bio is not permitted to span multiple map targets/segments. Also at each level, each cloned bio may be passed to the map callout of the target driver managing a mapped device. The target driver may have the option of queuing the I/O internal to that driver to be serviced at a later time by that driver, redirecting the I/O to one or more different target devices and possibly a different sector in each of those target devices, and/or returning an error status for the bio to the device mapper. FIG. 13 illustrates implementation of the filter module 202 in the linux. However, it should be noted that the implementation is possible in other systems also.

In an example embodiment, the filter module 202 being implemented in windows system may be described below. In one or more embodiments, a driver and a service communication may be initiated by service. The service may communicate to driver using IO Control codes. An API DeviceIoControl function may be used to communicate IO Control codes to the driver. The IO Control codes may be sent on volume handles or the handle retrieved by opening the dedicated device object created by the driver. The driver may create a device object with a specific name and link for this device. The service may use CreateFile API with file name. This would open the dedicated device object created filter module 202 volume filter driver.

In one or more embodiments, the driver may provide below mentioned IO Control codes for enabling communication:
1. IOCTL_SVSYS_SERVICE_SHUTDOWN_NOTIFY
2. IOCTL_SVSYS_GET_DIRTY_BLOCKS
3. IOCTL_SVSYS_CLEAR_BITMAP
4. IOCTL_INMAGE_STOP_FILTERING_DEVICE
5. IOCTL_INMAGE_START_FILTERING_DEVICE and
6. IOCTL_INMAGE_GET_VOLUME_STATS The IOCTL_SVSYS_SERVICE_SHUTDOWN_NOTIFY may be used by service to register that service has started. The driver may never complete this IOCTL and cancellation of this IOCTL is treated as Service shutdown. The service may send this IOCTL (Input/Output Control) at its initialization phase as soon as the volume or device object is opened. The driver may keep this IOCTL pending and never completes it. The service may notify the driver that it has no interest in collecting dirty changes or it is getting ready to shutdown by calling API CancelIO on the file handle used to send this IOCTL. When this API is called, the system may cancel the pending IO resulting in calling cancellation of this IOCTL. If Service crashes or exits with out canceling this IOCTL, the system would call the cancellation on all pending IO.

The IOCTL_SVSYS_GET_DIRTY_BLOCKS may be deprecated and not used any more. The driver may return STATUS_INVALID_DEVICE_REQUEST for this IOCTL. The IOCTL_SVSYS_CLEAR_BITMAP may be used to clear the dirty bit map maintained by the driver for a volume. This IOCTL can be sent on control device object name filter module or can be sent on Volume Object. When sent on Volume device the bitmap to be cleared is implicit, bit map corresponding to volume device on which the IOCTL is sent is cleared. When sent on Control device the bitmap volumes GUID has to be sent in Input Buffer.

The IOCTL_INMAGE_STOP_FILTERING_DEVICE may be used to stop recording dirty changes on a specified volume. This IOCTL can be sent on control device object name FilterModule or can be sent on Volume Object. When sent on Volume device the device whose change monitoring has to be stopped is implicit, monitoring of the volume device on which the IOCTL is received is stopped. When sent on Control device the GUID of the volumes whose change monitoring has to be stopped is sent in Input Buffer.

The IOCTL_INMAGE_START_FILTERING_DEVICE may be used to start recording dirty changes on a specified volume. This IOCTL can be sent on control device object name FilterModule or can be sent on Volume Object. When sent on Volume device the device whose change monitoring has to be started is implicit, monitoring of the volume device on which the IOCTL is received is started. When sent on Control device the GUID of the volumes whose change monitoring has to be started is sent in InputBuffer.

The IOCTL_INMAGE_GET_VOLUME_STATS may be used to retrieve volume statistics for all volumes are for a specified volume. This IOCTL can be sent on control device object name FilterModule or can be sent on Volume Object. When sent on a volume device, driver returns statistics related to the volume device on which IOCTL is received. When sent on control device driver returns statistics related to all volumes.

In one or more embodiments, the filter module 202 may communicate with several external modules that the system may call for performing specific operations. The aforementioned modules as described may include:
  7. Driver Initialization Module (DriverEntry)
  8. Add Device Module (InMageFltAddDevice)
  9. Plug & Play Module (InMageFltDispatchPnP)
  10. Write Filtering Module (InMageFltWrite)
  11. Flush Module (InMageFltFlush)
  12. Device IO control Module (InMageFltDeviceControl)
  13. Cancel Shutdown IRP Module (InMageFltCancelServiceShutdownIrp).

Furthermore, the filter module 202 (e.g., filter driver) may include other internal modules which may be initiated by the filter module 202. The system may not call the modules internal to the filter module 202 directly. The modules internal to the filter module 202 may be triggered by events to cause processing of data. In one or more embodiments, the internal modules to the filter driver may include a Service and Device state change action thread and a Worker thread. In addition, the filter module 202 interalia, may include two major data structures: DEVICE_SPECIFIC_DIRTY_BLOCKS_CONTEXT and DIRTY_BLOCKS.

Furthermore, the filter module 202 may track the service states, configure dirty change thresholds, registry entries common for all volumes and registry entries per volume. In one or more embodiments, the filter module 202 may tracks the state of the service using enumeration etServiceState. The filter module 202 may maintain the state of the service in Driver Context structure. In one or more embodiments, defined values for the enumeration may include, but not limited to ecServiceNotStarted, ecServiceRunning, and ecServiceShutdown.

In one or more embodiments, the filter module 202 when started may initialize the service state ecSerivceNotStarted. This service state may indicate that the service has not yet started and is not ready to retrieve the dirty changes from driver. In one or more embodiments, in the service state ecServiceRunning, the state driver assumes that the service is started and in a mode where the state driver can retrieve the dirty changes for all volumes. The state ecServiceRunning may be the state in which the product is completely operational. In one or more embodiments, in a state Service State ecServiceShutdown, the state driver may assume that the service is shutdown and not running. The filter module 202 may never change the state of service from the ecServiceRunning to the ecServiceNotStarted. When the service may be shutdown or decided to go to a mode where it would not retrieve the dirty changes from driver the service is put in to the mode ecServiceShutdown.

In one or more embodiments, the events trigger change of service states. In an embodiment, the filter module 202 may change the state of service from the ecServiceNotStarted to the ecServiceRunning only when the filter module 202 receives a IOCTL_IOCTL_SVSYS_SERVICE_SHUTDOWN_NOTIFY. The filter module 202 may keep the IOCTL pending, the IOCTL is never completed by the filter module 202. The IOCTL may have to be cancelled either by the system or the service when the system does not want to retrieve any more changes. As the filter module 202 changes service state to the ecServiceRunning, the bitmap corresponding to all volumes are read and data changes are added to dirty blocks list.

In another embodiment, the filter module 202 may change state of service from the ecServiceRunning to the ecServiceShutdown when the filter module 202 receives cancellation for prior received IOCTL IOCTL_SVSYS_SERVICE_SHUTDOWN_NOTIFY. On receiving the cancellation the filter module 202 may change service state from the ecServiceRunning to the ecServiceShutdown. The service may initiate cancellation of IOCTL by calling CancelIO Win32 API, or if service crashes for any reason system cancels all the pending IO of the crashed process.

In another embodiment, the filter module 202 may change a state of service from the ecServiceShutdown to the ecServiceRunning when the filter module 202 receives the IOCTL_IOCTL_SVSYS_SERVICE_SHUTDOWN_NOTIFY.

In one or more embodiments, the dirty change threshold may be changed. Threshold of dirty block changes have default values hard coded in to code. The values may be changed by specifying them in a registry. Threshold logic may be disabled by specifying the values as zero in the registry. In one or more embodiment, the filter module 202 may change dirty threshold during any of a dirty change thresholds when the service is not started, dirty change threshold when service is running and dirty change threshold when service is shutdown.

In one or more embodiments, the filter module 202 may also include several other functions such as a DeviceIoControlServiceShutdownNotify function, a InMageFltCancelServiceShutdownIrp function, an InMageFltRemoveDevice function, an InMageFltWrite function, and ServiceStateChange Function. In one or more embodiments, the filter module 202 may also manage the registry. The registry entries may be broadly defined under two categories. The first category may be a common one for all volumes, the second category is per volume. Per volume registry entries may be added under the Key with volume name. Common registry entries may be added under Parameters Key.

In one or more embodiments, the registry entry function in common may be performed by the functions that includes, but not limited to:
  1. DirtyBlockHighWaterMarkServiceNotStarted,
  2. DirtyBlockLowWaterMarkServiceRunning,
  3. DirtyBlockHighWaterMarkServiceRunning,
  4. DirtyBlockHighWaterMarkServiceShutdown, and
  5. DirtyBlocksToPurgeWhenHighWaterMarkIsReached.

In one or more embodiments, the per volume entries may be generated under a volume key. Volume keys are in the format Volume{da175ce3-ee10-11d8-ac16-806d6172696f}. In addition, the filter module 202 may create a registry key by default per each volume that is being filtered. Furthermore, the per volume entry may be performed using functions that include, but not limited to:
  1. VolumeFilteringDisabled,
  2. VolumeBitmapReadDisabled,
  3. VolumeBitmapWriteDisabled,
  4. VolumeResyncRequired,
  5. VolumeOutOfSyncCount,
  6. VolumeOutOfSyncErrorCode,
  7. VolumeOutOfSyncTimeStamp, and
  8. VolumePagefileWritesIgnored.

Although the present embodiments has been described with reference to specific example embodiments. It will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium).

For example, the application module 200 (and all the modules in the application module 200 as illustrated in FIG. 2). The filter module 202 (and all the modules in the filter module 202 as illustrated in FIG. 2), the backup data transfer module 220 and/or the consistency module 204 (and all the modules within the consistency module of FIG. 2), may be enabled using transistors, logic gates, and electrical circuits (e.g., application specific integrated ASIC circuitry) using a write detection circuit, a marker data generator circuit, a backup application programming interface circuit, a backup data transfer circuit, and/or a consistency request generator circuit.

In addition, it will be appreciated that the various operations, processes, and methods disclosed herein may be embodied in a machine-readable medium and/or a machine accessible medium compatible with a data processing system (e.g., a computer system), and may be performed in any order. Accordingly, the specification and drawings are to be regarded in an illustrative rather than a restrictive sense.

What is claimed is:

1. A method, comprising:
  implementing a filter module in an operating system environment associated with an application server to track changes on a storage device coupled to the application server;
  generating, in a continuous backup environment, a backup data through the filter module associated with the application server by copying a data write associated with the application server;
  utilizing a data log structure on the storage device coupled to the application server to store the backup data generated by the filter module;
  buffering the backup data generated by the filter module through a memory module associated with the application server that transfers the backup data to the data log structure on the storage device based on an occurrence of an event;
  differentiating the backup data generated by the filter module from the data write associated with the application server using a detection algorithm of the filter module when the memory module transfers the backup data to the data log structure; and
  allowing the backup data to permeate through the filter module to prevent a recursion loop that arises when the filter module makes a redundant copy of the backup data during a transition of the backup data from the memory module to the data log structure on the storage device.

2. The method of claim 1, further comprising:
  utilizing a paged memory of the memory module to buffer the backup data when a storage capacity of the memory module crosses a memory threshold in the continuous backup environment;
  distinguishing a write associated with the paged memory from at least one of the backup data and the data write of the application server at the filter module using the detection algorithm when the paged memory accesses at least one of a page file and a swap volume on the storage device to buffer the backup data; and
  allowing the write associated with the paged memory to pass through the filter module to prevent at least one of a system crash and the recursion loop that occurs when the filter module makes the redundant copy of the write during the transition of the write associated to the paged memory to the at least one of the page file and the swap volume on the storage device.

3. The method of claim 2, further comprising:
  utilizing the data log structure on the storage device coupled to the application server to buffer the backup data when a capacity of the paged memory reaches a threshold value;
  cycling the backup data through a plurality of data log structures on the storage device when a particular data log structure reaches a threshold capacity; and
  inserting a tracking data in the memory module to mark the shift from the particular data log structure to another data log structure of the plurality of data log structures to keep track of the backup data in the continuous backup environment when the particular data log structure reaches the threshold capacity.

4. The method of claim 1,
  wherein the storage device is at least one of a protected storage device and a non-protected storage device having a file system associated therewith, and
  wherein the event is at least one of a planned shutdown event, an unplanned shutdown event and a user requested event.

5. The method of claim 4, wherein further comprising creating the data log structure by configuring a portion of the storage device as a dedicated resource available to the memory module to copy the backup data, wherein the data log structure is a file on the storage device coupled to the application server having the file system.

6. The method of claim 1, further comprising depositing, through the filter module, a collection of data writes of the application server that remains to be recorded in a meta-data registry of the memory module to the data log structure on the storage device coupled to the application server to prevent a data loss during the unplanned shutdown event.

7. The method of claim 1, wherein the filter module is applied at least one of a logical volume level and a physical volume level in an operating system storage stack of the application server.

8. The method of claim 1, further comprising:
  generating a consistency request through a consistency module associated with the filter module in the continuous backup environment;
  communicating the consistency request to a backup application programming interface of the application server to prepare the application server for a dynamic backup operation;
  creating a marker data to connote a consistency point of the application server; and
  introducing the marker data through the filter module into the memory module in the continuous backup environment such that the backup data can be restored to the consistency point using the marker data.

9. The method of claim 8, wherein the consistency request is triggered by a consistency event, and wherein the consistency event is at least one of a scheduled event, an unscheduled event and a user initiated event.

10. The method of claim 8, further comprising:
  quiescing multiple storage devices coupled to the application server based on the consistency event; and
  applying the marker data in a synchronous manner across the multiple storage devices to denote a particular consistency point.

11. The method of claim 8, further comprising applying the marker data across multiple application servers through a network based on the consistency event.

12. The method of claim 1, further comprising:
analyzing the data write of the application server through an algorithm of the filter module to determine a descriptor information associated with the data write of the application server; and
automatically introducing the marker data to indicate an event data based on the descriptor information.

13. The method of claim 12, wherein the descriptor information is at least one of an application file information, an application status information and an application data change information.

14. The method of claim 1, further comprising:
extracting a meta-data information associated with the data write of the application server to ascertain a location of the data write when the data write of the application server is received by the filter module;
comparing the meta-data information of a particular data write to the meta-data information of a plurality of data writes to detect an overlapping pattern of the particular data write with other data write in the storage device; and
performing a memory optimization when the storage capacity of the memory module crosses the memory threshold by retaining the particular data write when the particular data write exhibits the overlapping pattern.

15. The method of claim 14, further comprising:
enhancing the memory optimization by maintaining only a journal of the meta-data information associated with the data write on the memory module; and
applying the journal of the meta-data information to the storage device to locate a data corresponding to the data write of the application server.

16. The method of claim 15, wherein the meta-data information associated with the data write is at least one of a volume information, an offset information, a length information and a data size information.

17. The method of claim 14, further comprising:
retaining, through the memory module, the particular data write of the application server when the particular data write displays the overlapping pattern with the other data write in the storage device coupled to the application server; and
preserving, through the memory module, a registry of the meta data information associated with the other data write that can be utilized to selectively copy and create the backup data from the other data write in the continuous backup environment.

18. The method of claim 1, in a form of a machine-readable medium embodying a set of instructions that, when executed by a machine, causes the machine to perform the method of claim 1.

19. A network comprising:
an application server having a filter module implemented in an operating system environment associated therewith to track changes on a storage device coupled thereto, the filter module being coupled to a memory module to facilitate a continuous data backup of the application server and to prevent a data loss triggered by an event during the continuous data backup by facilitating transfer of a backup data buffered in the memory module to a data log structure resident on the storage device, the backup data being generated by the filter module by copying a data write associated with the application server, the backup data being differentiated from the data write of the application server using a detection algorithm of the filter module when the memory module transfers the data backup to the data log structure, and the backup data being allowed to permeate through the filter module to prevent a recursion loop that arises when the filter module makes a redundant copy of the backup data during a transition of the backup data from the memory module to the data log structure on the storage device; and
a backup server connected to the application server via the network to store the backup data on a backup storage device coupled to the backup server on a continuous basis.

20. The network of claim 19, further comprising a consistency module of the application server to place a flag in the memory module to indicate a data consistency point of an application during a dynamic backup of the application server in a continuous backup environment.

21. The network of claim 19, wherein the event is at least one of a planned shutdown event, an unplanned shut down event and a user requested event, and wherein the filter module coupled to the memory module dumps a backlog of data write of the application server to the data log structure resident on the storage device to prevent the data loss triggered by the unplanned shut down event.

22. An application server in a backup environment comprising:
a memory buffer having a paged memory capable of utilizing at least one of a page file and a swap volume on the application server to enhance a storage capacity of the memory buffer when the storage capacity crosses a threshold value;
a disk buffer on the application server to backup the memory buffer when the memory buffer faces an imminent data loss associated with an event; and
a filter module to extract a descriptor information from a data write of the application server to position a pointer data in the memory buffer based on an analysis of the descriptor information such that the pointer data corresponds to an event data of the application server, to extract a meta data information associated with the data write of the application server to ascertain a location of the data write when the data write of the application server is received thereat, to compare the meta-data information of a particular data write to the meta-data information of a plurality of data writes to detect an overlapping pattern of the particular data write with another data write in a storage device associated with the application server, and to enable performing a memory optimization when the storage capacity of the memory module crosses the memory threshold by retaining the particular data write when the particular data write exhibits the overlapping pattern.

23. The application server of claim 22, further comprising a consistency module to facilitate interaction between the filter module and a particular application of the application server to coordinate placement of the pointer data in a synchronous fashion across multiple storage devices of the application server to denote a common consistency marker across the multiple storage devices for the particular application.

24. The application server of claim 22, wherein a detection algorithm of the filter module differentiates the data write of the application server from at least one of a write of the paged memory and a backup data of the memory buffer, and wherein the filter module selectively copies only the data write of the application server to avoid a recursion phenomena caused due to a redundant copy generated from either of the write of the paged memory and the backup data of the memory buffer.

* * * * *